Oct. 28, 1952 R. H. HERRICK 2,616,032

SINGLE CHANNEL MOBILE TELEPHONE SYSTEM

Filed Oct. 20, 1948 10 Sheets-Sheet 1

INVENTOR.
ROSWELL H. HERRICK

BY McWalter Owen.

ATTORNEY

Oct. 28, 1952 R. H. HERRICK 2,616,032

SINGLE CHANNEL MOBILE TELEPHONE SYSTEM

Filed Oct. 20, 1948 10 Sheets-Sheet 2

INVENTOR.
ROSWELL H. HERRICK

BY [signature]

ATTORNEY

INVENTOR.
ROSWELL H. HERRICK
BY Wm. Walter Owen.
ATTORNEY

Oct. 28, 1952 R. H. HERRICK 2,616,032
SINGLE CHANNEL MOBILE TELEPHONE SYSTEM
Filed Oct. 20, 1948 10 Sheets-Sheet 4
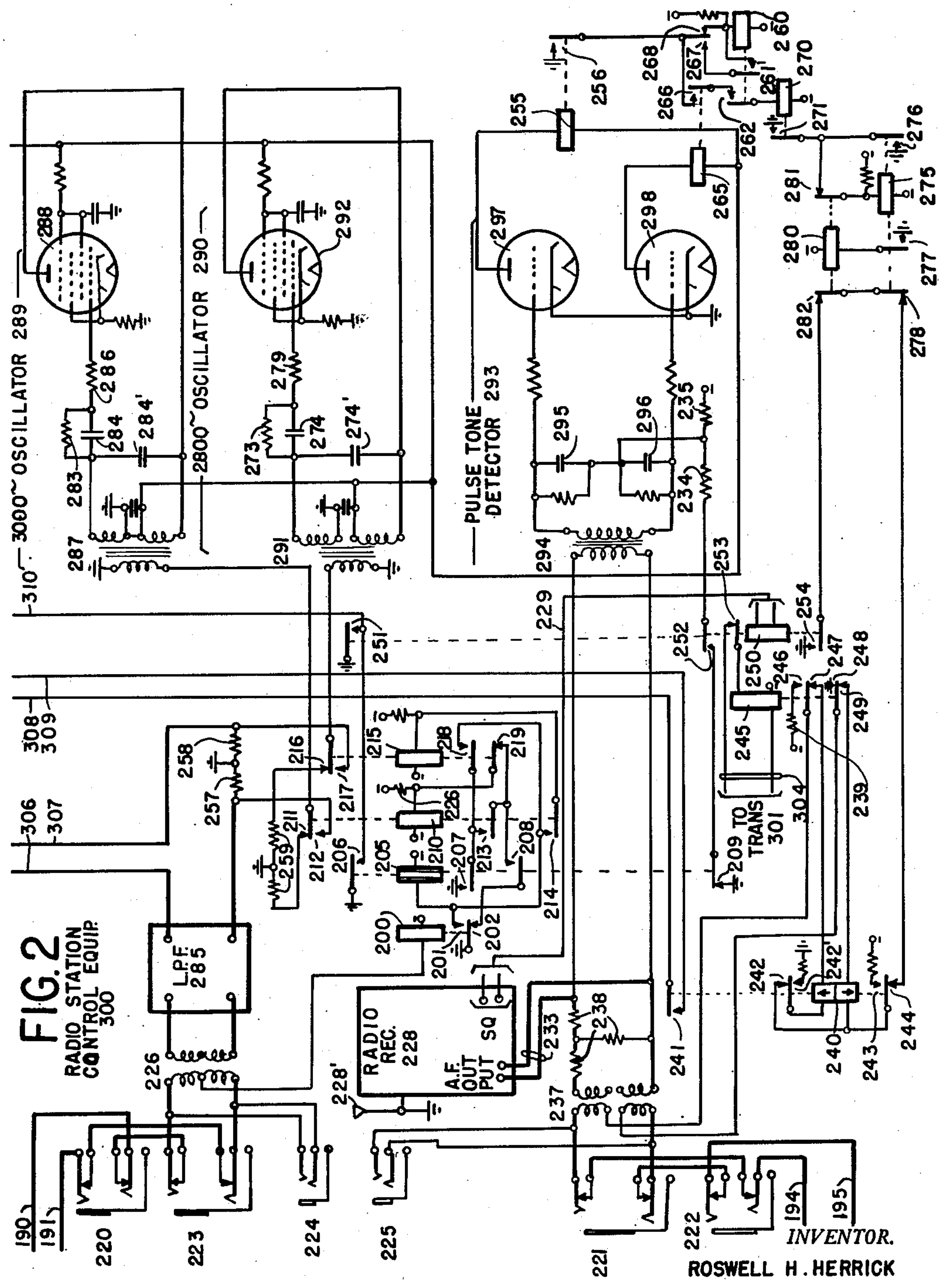
FIG. 2 RADIO STATION CONTROL EQUIP. 300
INVENTOR.
ROSWELL H. HERRICK
BY
[signature]
ATTORNEY INVENTOR.
ROSWELL H. HERRICK
BY Wm. Walter Owen
ATTORNEY

MOBILE UNIT 500

INVENTOR.
ROSWELL H. HERRICK
BY Wm. Walter Owen
ATTORNEY

Oct. 28, 1952 R. H. HERRICK 2,616,032

SINGLE CHANNEL MOBILE TELEPHONE SYSTEM

Filed Oct. 20, 1948 10 Sheets-Sheet 7

INVENTOR.
ROSWELL H. HERRICK

BY Mc Walter Owen.

ATTORNEY

SINGLE CHANNEL MOBILE TELEPHONE SYSTEM

INVENTOR.
ROSWELL H. HERRICK

BY Wm. Walter Owen

ATTORNEY

INVENTOR.
ROSWELL H. HERRICK
BY [signature]
ATTORNEY

Oct. 28, 1952 R. H. HERRICK 2,616,032
SINGLE CHANNEL MOBILE TELEPHONE SYSTEM
Filed Oct. 20, 1948 10 Sheets-Sheet 10
FIG. 7A MOBILE UNIT 500
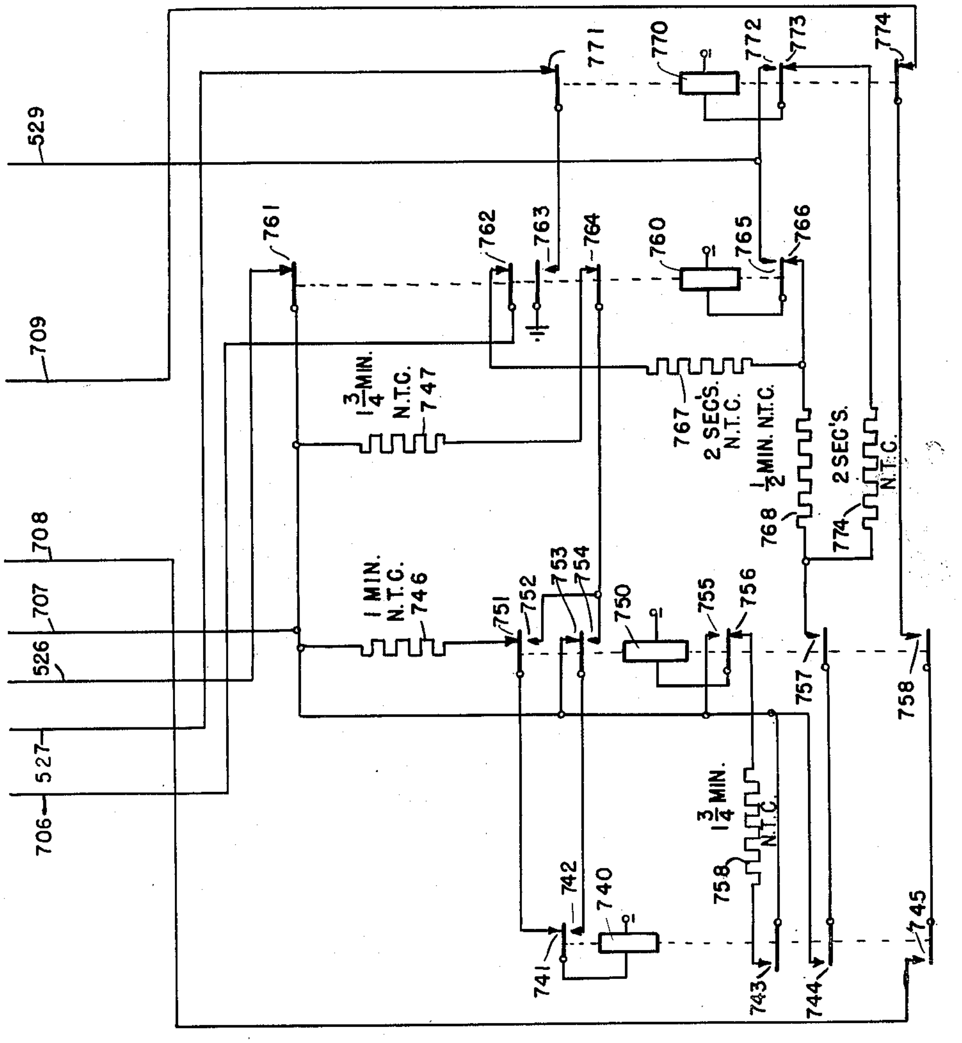
INVENTOR.
ROSWELL H. HERRICK
BY Mc Walter Owen.
ATTORNEY Patented Oct. 28, 1952 2,616,032

UNITED STATES PATENT OFFICE 2,616,032

SINGLE CHANNEL MOBILE TELEPHONE SYSTEM

Roswell H. Herrick, Lorain, Ohio, assignor to Automatic Electric Laboratories, Inc., Chicago, Ill., a corporation of Delaware Application October 20, 1948, Serial No. 55,627

23 Claims. (Cl. 250—6)

Figure 1A:
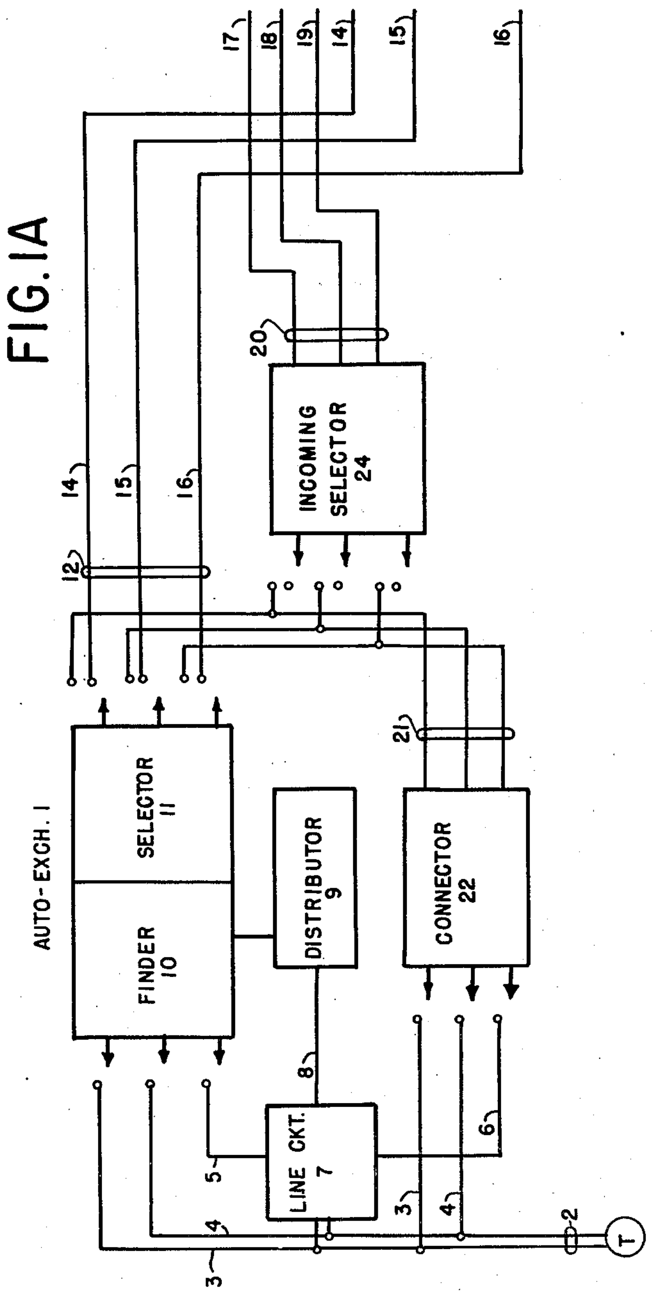

The present invention relates in general to mobile telephone systems, wherein radio transmitters and receivers are employed to complete telephone connections between a fixed station and a number of mobile stations, such as automobiles or pleasure boats or the like, and is particularly concerned with systems of this type for establishing connections between any one of the regular fixed subscribers of a regular land telephone exchange and any one of a group of mobile subscribers, over a single channel.

The main object of the invention is to provide a system of this type which will be operative with a standard automatic telephone exchange, and in which connections may be established in either direction by dialling the regular assigned directory number of the wanted fixed or mobile party, without the intervention of an operator.

Another object of the invention is the incorporation in such a system of complete secret service, with fully selective ringing, and the usual dial-tone, busy-tone, and answer signal, on calls in both directions.

A feature of the invention is the use of two fixed modulating frequencies for each dialling impulse sent over the air, wherein the two frequencies are applied successively to the carrier in a predetermined order and a fixed time relationship, and are held simultaneously on the air for a brief interval before their removal at the end of the first half of each pulse, in order to reduce the danger of interference or false operations from speech frequencies, stray frequencies, static, or other causes.

Another feature consists in the use of only four conductors between the telephone exchange and the fixed radio control station, and the use of these conductors for impulsing, for speech, for tone signals, and for other control functions.

Another feature of the invention is the provision of last party release of the fixed radio station on calls originating at the automatic exchange, whereas on a call from a mobile unit, release of the fixed station is under control of the calling mobile subscriber.

Another feature of the invention consists in the use of a call timer in the mobile unit, which gives the mobile subscriber a warning signal in case a call should be prolonged unduly, and automatically cuts the mobile unit off the air after an additional interval. This feature prevents any long drawn out conversations which might monopolize the single channel employed. This feature is also effective in case of accident or the like, where a mobile unit might inadvertently or otherwise simulate the initiation of a call.

A further feature consists in the provision of an "out-of-range" timer in each mobile unit, whereby, if a mobile subscriber attempts a call with the channel apparently free, and the fixed station's carrier is not received back within a given time interval, the mobile unit is again automatically taken off the air. This feature guards against a mobile subscriber interfering with other calls while out of range of the fixed station's carrier, or while having a defective radio receiver, or the like.

Another feature of the invention is the provision of both amplified and unamplified audible signals and a number of signal lamps in the mobile unit, to advise the mobile subscriber of the condition of the equipment at all times.

Still another feature consists in the provision of a "camp-on-busy" key in the mobile unit, whereby a mobile subscriber, finding the channel busy on attempting to initiate a call, may by the operation of this key, seize the channel automatically as soon as it is free, and be notified thereof by both visual and audible signals.

Other objects and features of the invention will also be apparent from the specification and claims which follow.

Figure 5:
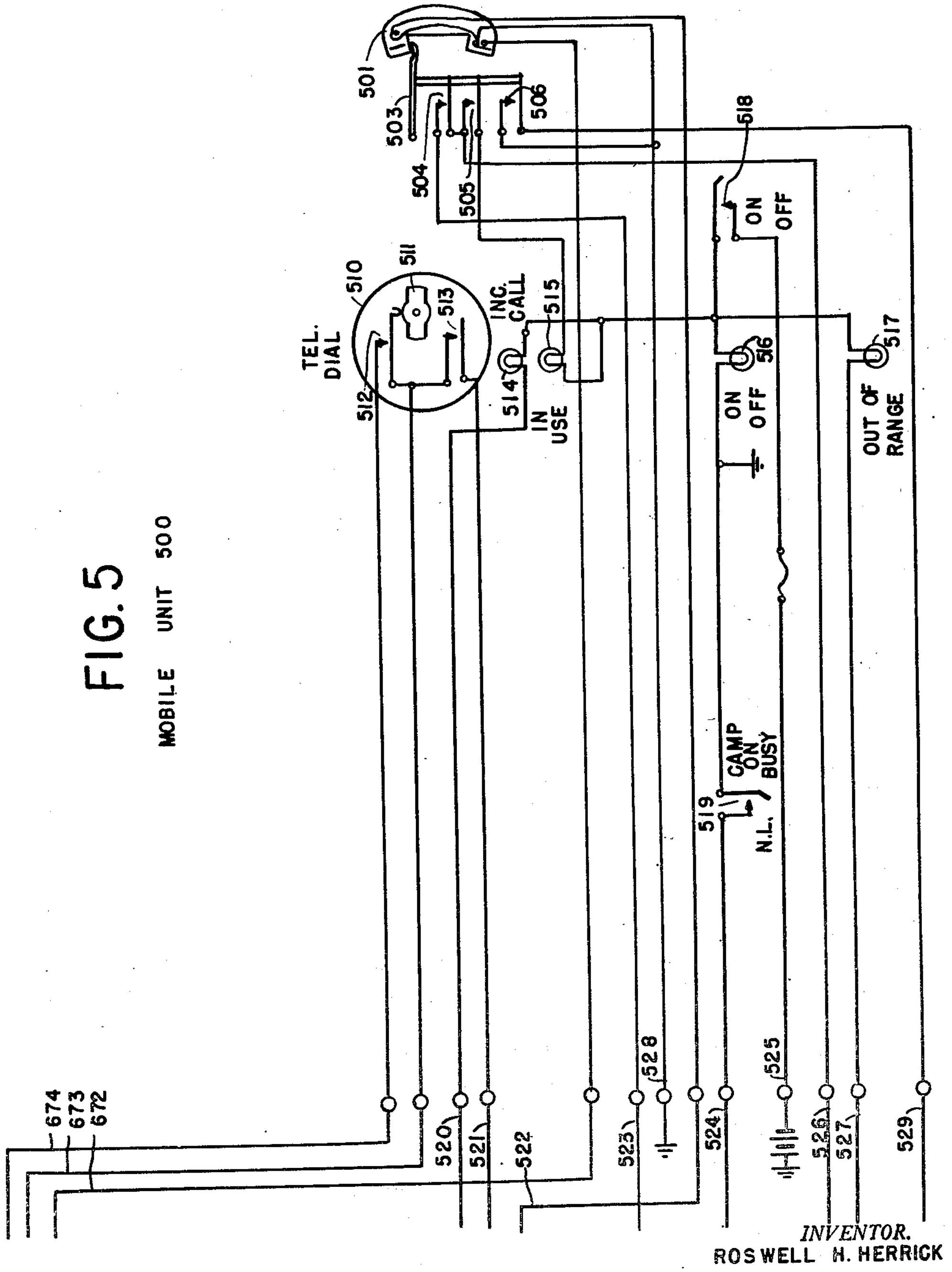
Figure 6:
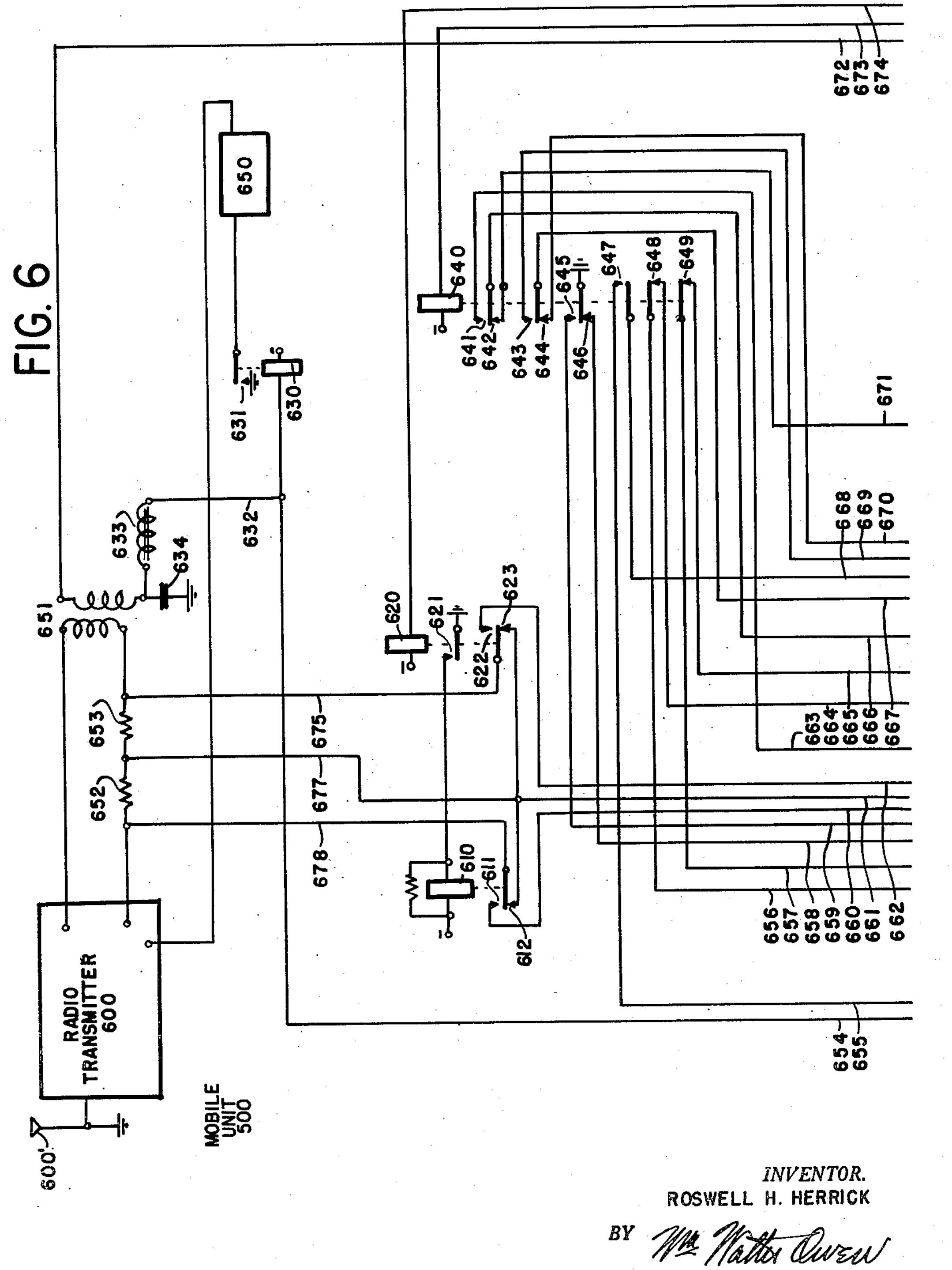
Figure 7:
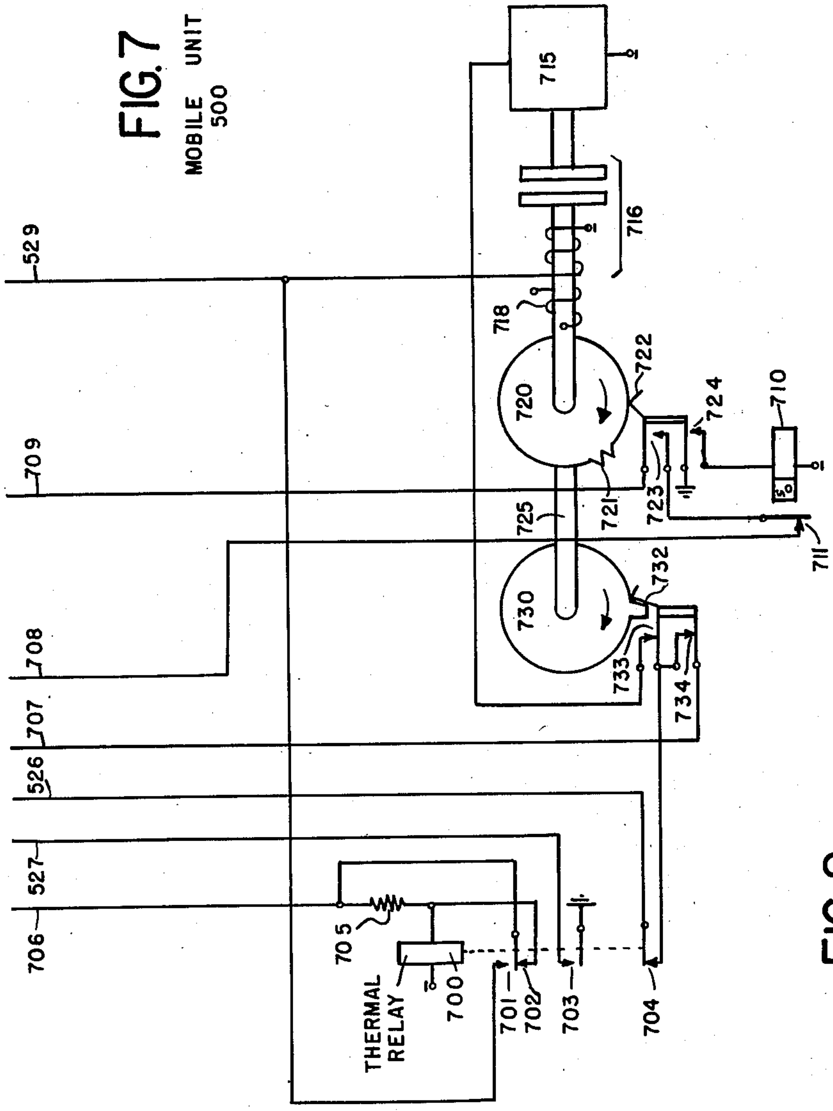
Figure 9:
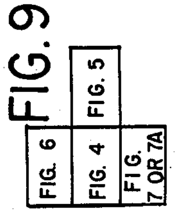
Figure 8:
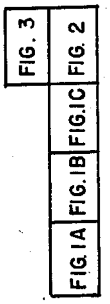

The invention both as to its organization and method of operation together with further objects and advantages thereof, will best be understood by reference to the following specification taken in connection with the accompanying drawings comprising Figures 1A, 1B, 1C, Figures 2 to 7 inclusive, and Figure 7A which when arranged in accordance with the Figures 8 and 9, illustrate the present invention comprising an automatic exchange 1 and an associated radio station control circuit 300 which is accessible to the automatic switches in the automatic exchange by means of a trunk repeater circuit 49 and central office auxiliary equipment 179. The radio station control circuit 300 cooperates with a group of mobile units, such as the illustrated unit 500.

More particularly, Fig. 1A illustrates in block formation an automatic exchange accessible to a group of subscribers such as T, and the switching apparatus whereby the subscriber T may make or receive calls through the trunk repeater circuit 49.

Figure 1B:
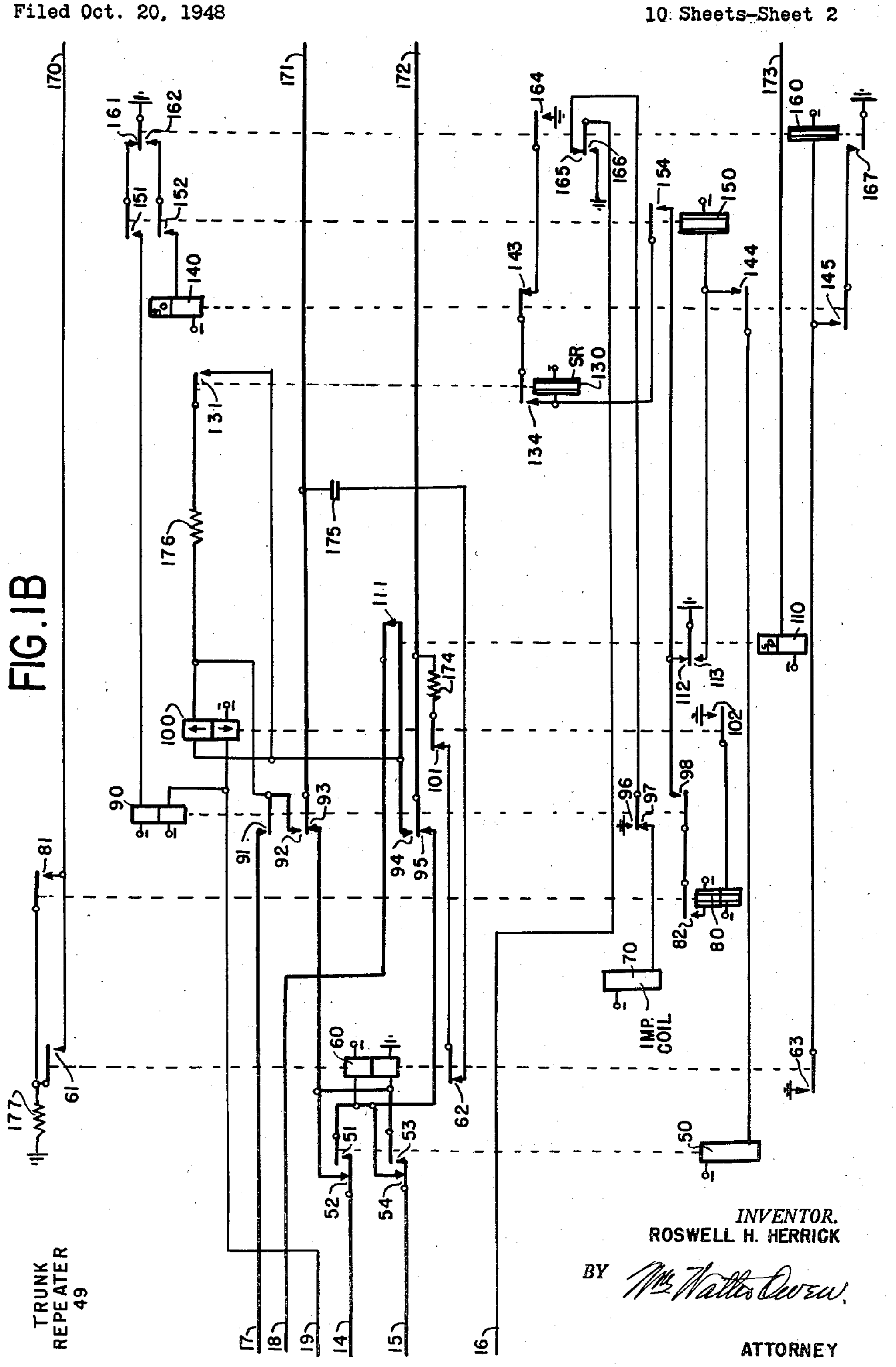

Figure 1B illustrates the two-way trunk repeater circuit 49 associated with the automatic exchange whereby incoming and outgoing calls may be automatically extended between the radio station control circuit 300 and the automatic exchange 1.

Figure 1C:
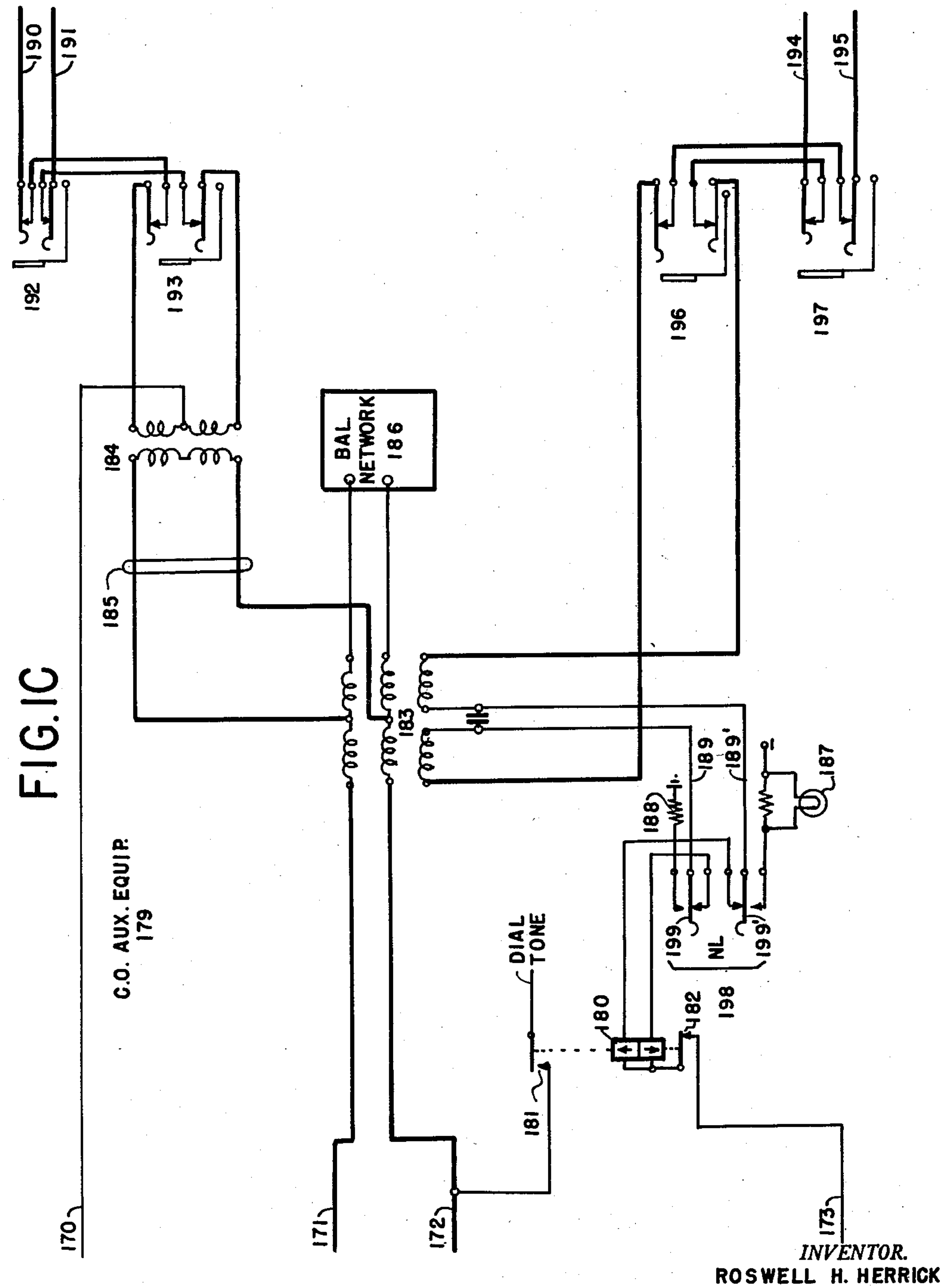

Figure 1C is a digrammatic illustration of the central office auxiliary equipment 179 which is associated with the trunk repeater in establishing calls between the subscriber in the automatic exchange 1 and the radio station control circuit 300.

Figure 3:
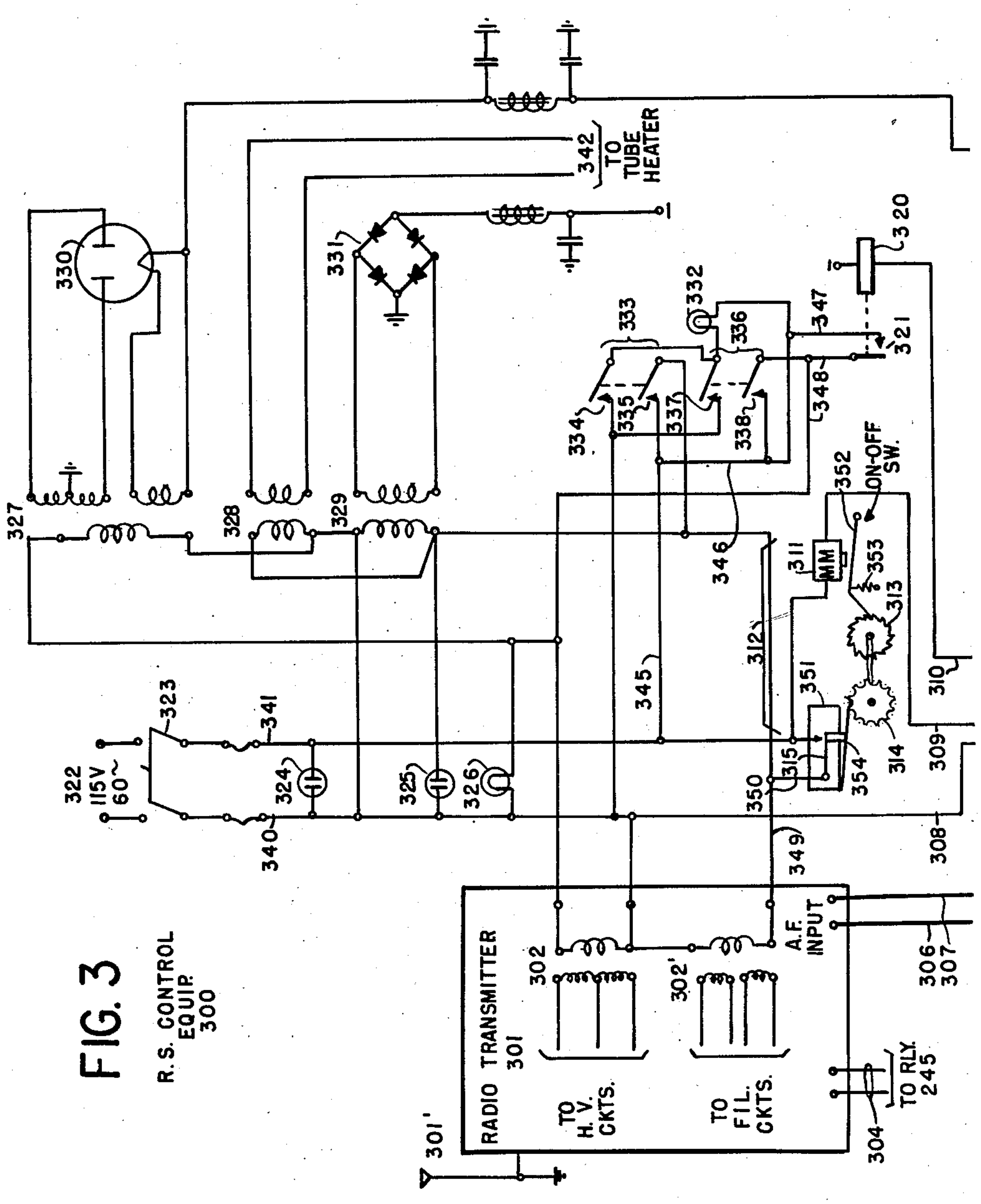

Figures 2 and 3 illustrate the details of the radio station control circuit 300 and the apparatus for transmitting and receiving calls to and from the associated mobile units.

Figure 4:
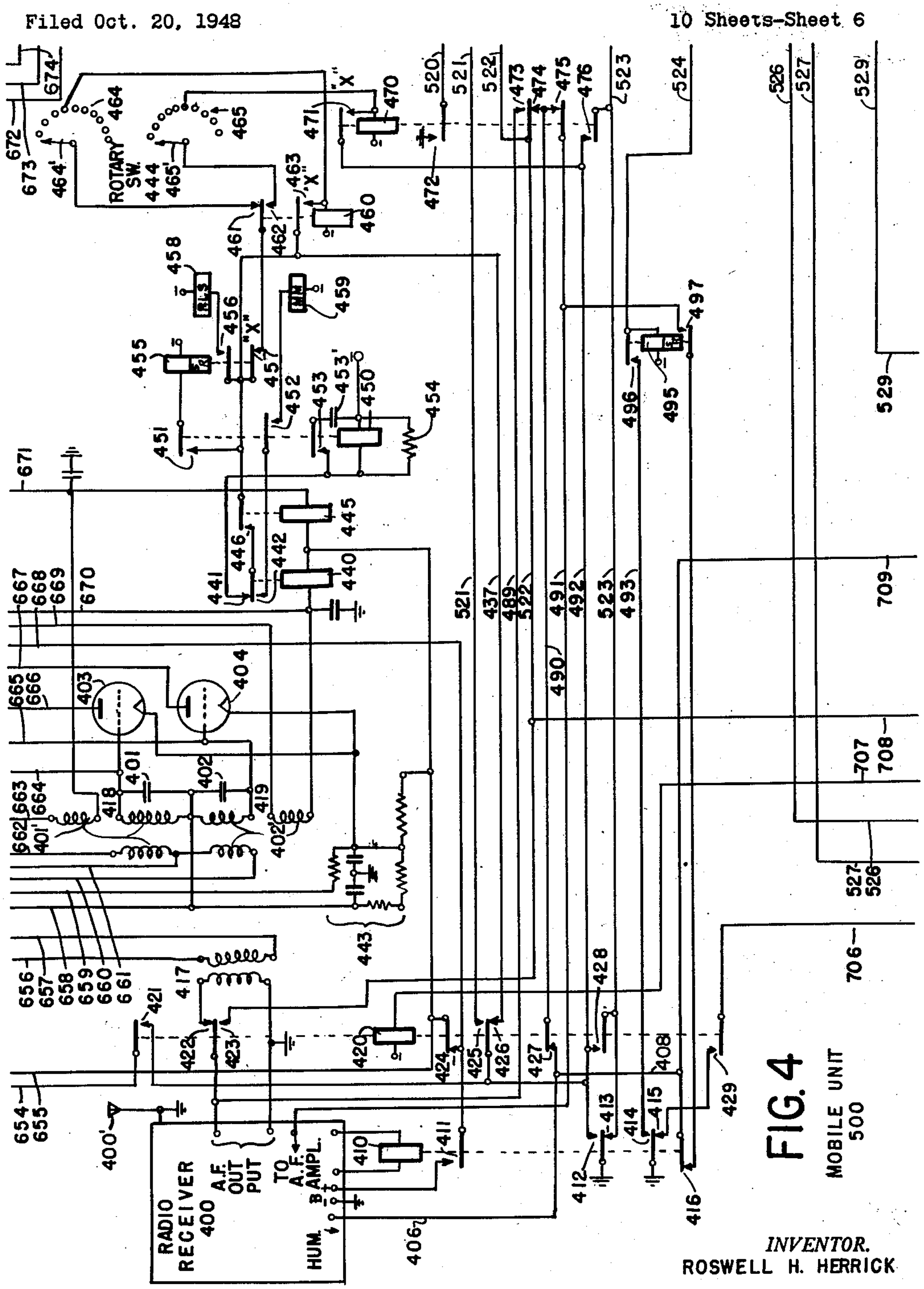

Figures 4, 5, 6, 7, and 7A are diagrammatic illustrations of the radio transmitter and receiver equipment located in each of the mobile units, the apparatus in Figure 5 being illustrative of the dash control apparatus in the mobile unit and Figures 4, 6 and 7 being illustrative of the transmitter and receiver and control apparatus located in the mobile unit, with Figure 7A as an alternative to Figure 7.

The automatic exchange is connected to the central office auxiliary equipment 179 by conductors 170, 171, 172 and 173. The central office auxiliary equipment 179 further connects the automatic exchange to the radio station control circuit 300 over conductors 190, 191, 194 and 195. The outgoing line conductors 190 and 191 from the automatic exchange to the radio station control circuit 300 are connected to the input circuit of radio transmitter 301 whereby the connection may be further extended to the mobile units, such as mobile unit 500, by common-channel carrier equipment. A radio receiver 400 in the mobile unit 500 is tuned to the carrier of transmitter 301 whereby a connection which is established from the automatic exchange may be extended over the radio transmitter 301 and its associated carrier channel to radio receiver 400. The radio receiver 400 and the mobile unit control apparatus in turn, extend the call to the telephone handset 501. In a similar manner the radio transmitter 600 located in the mobile unit 500 is cooperatively tuned with radio receiver 228 located in the radio station control circuit 300 whereby the channel associated with this transmitter-receiver pair is utilized to extend a call between the mobile set 500 and the radio station control circuit 300. The call is further extended by way of the incoming line conductors 194 and 195, to the central office auxiliary equipment 179, trunk repeater circuit 49, and the automatic switching apparatus in the automatic exchange.

Preferably the carrier system comprises a well-known commercial type frequency modulated unit wherein the individual-channel carrier transmitter equipment 301 located in the radio station control circuit 300 transmits a given carrier frequency modulated at times with a 3000 cycle and a 2800 cycle tone for signalling purposes. The radio receiver 400 in each mobile unit 500 is tuned to the carrier frequency of transmitter 301 thereby to comprise one of the carrier channels. The individual-channel carrier transmitter 600 located in the mobile unit 500 transmits a different carrier frequency also modulated at times with 3000 and 2800 cycle tones for signalling purposes. Radio receiver 228 in the radio control equipment 300 co-operates with the transmitter 600 to provide a second channel, for calls from the mobile units to the central station.

Considering the drawings in greater detail, Figure 1A shows subscriber line 2 extending to subscriber sub-station T and a line circuit 7 individually associated with subscriber line 2. The automatic switching apparatus comprises a plurality of groups of finder-selector links, each provided with an associated distributor, and which correspond with the groups of subscriber sub-stations. One of the groups of finder-selector links includes a finder 10 and the selector 11 and is provided with an associated distributor 9 common to the group; which group of finder-selector links is associated with the group of subscriber sub-stations including the subscriber sub-station T. Also the automatic switching apparatus comprises a plurality of groups of connectors respectively associated with the groups of subscriber sub-stations. One of the groups of connectors includes the connector 22 and is associated with a group of subscriber sub-stations including the subscriber sub-station T. The automatic switching apparatus further comprises a group of incoming selectors including the incoming selector 24. More particularly, the finder 10 of the finder-selector link illustrated has access to the subscriber line 2 extending to subscriber sub-station T; while the selector 11 of the finder-selector link illustrated has access to connector 22 by way of the associated trunk 21. Also the selector 11 has access to the outgoing trunk 12 extending into the trunk repeater circuit 49; while the incoming trunk 20 extending from the trunk repeater circuit 49 is terminated in the incoming selector 24. Finally the incoming selector 24 has access to the connector 22 by way of the associated trunk 21. Preferably the finders 10, the selectors 11, the selector 24, and the connectors 22, are two motion stepping switches of the well known Strowger type, but not necessarily. It should also be understood that while only one rank of selectors is shown, indicating a thousand line office, the insertion of intervening ranks of selectors would readily expand it to a larger size.

Referring to Figure 1B, the trunk repeater circuit 49 there illustrated has a set of leads 14, 15 and 16 comprising trunk 12 which is accessible to selector 11. Leads 14 and 15 are normally connected through the repeater circuit 49 to the talking conductors 171 and 172 which extend to the central office auxiliary equipment 179. Impulses received over trunk 12 are regenerated by line relay 60 over the signal-out conductor 170 which extends to the central office auxiliary equipment 179. Conductors 171 and 172 serve to transmit the voice frequencies in both directions. The trunk repeater 49 further comprises a signal-in relay 110 which is effective to repeat impulses received from a mobile unit over the central office auxiliary equipment 179, to the incoming selector 24 over conductors 17 and 18 of trunk circuit 20. The inward talking circuit associated with the signal-in circuit, passes over the previously mentioned conductors 171 and 172 and is further extended over conductors 17 and 18 of trunk 20, and an incoming selector and a connector to the wanted party such as subscriber T. Figure 1C illustrates the central office auxiliary equipment which serves to connect the automatic exchange equipment to the radio station control circuit 300. This equipment is preferably located in the telephone exchange building. If however the location of the telephone exchange is not such as to provide the best radio operating conditions, the fixed radio station equipment may be located at some remote point. The central office auxiliary equipment is connected to the radio station control circuit by two pair of simplexed audio conductors 190, 191, 194 and 195. This auxiliary equipment comprises mainly hybrid transformer 183 and an associated balancing network 186. The hybrid transformer 183 serves to effect the separation between outgoing and incoming speech, as necessitated by the inherent one-way characteristics of the associated radio transmitter and receiver. The talking conductors 171 and 172 extend over the middle and upper windings of hybrid transformer 183 to a repeating coil 184 and are further extended to the radio station control circuit over conductors 190 and 191 which comprise the outgoing path. The outgoing simplex control conductor 170 likewise extends to the repeating coil 184 and thence over conductors 190 and 191 to the radio station control equipment. Conductors 194 and 195, comprising the incoming audio channel and an associated simplex circuit are connected to the lower winding of hybrid transformer 183 whereby the voice currents received over these conductors are induced into the middle windings of hybrid transformer 183 and are thereby extended over the conductors 171 and 172 to the trunk repeater circuit 49 and to the automatic exchange. The incoming simplex circuit is extended over conductor 173 to trunk repeater 49 for signalling purposes. On outgoing calls, a direct current circuit from the automatic exchange is closed to the radio transmitter control circuit over conductors 170, 190 and 191 to seize equipment therein, and the subsequent dialling results in interruptions of this simplex circuit to operate relay equipment and more particularly the line relay 200, in the radio station control circuit. Similarly the incoming simplex circuit extending to the automatic exchange is effective to seize an exchange link, the incoming impulses being formed by interruptions of the simplex circuit to control the seized link. In some instances the radio station location will be such that it will be inconvenient or inaccessible to the wire chief and it is therefore desirable that the radio station control circuit have remotely controlled switching circuits. A switch 198 comprising key contacts 199 and 199' is located in the central office auxiliary equipment 179 and is effective when operated to control the master power circuit for the radio station control equipment. This remote control function is accomplished over the normal existing conductors between the central office auxiliary equipment and the radio station control equipment. Indicator light 187 is operated when the remote control operation has been completed.

Figures 2 and 3 illustrate the details of radio station control circuit 300. Figure 2 shows the connections between the central office auxiliary equipment 179 and the radio station control circuit 300, which comprise the outward conductors 190 and 191, and the inward conductors 194 and 195. The outward conductors 190 and 191 are connected to repeating coil 236 whereby the outgoing audio frequencies pass through low pass filter 285, to conductors 306 and 307 which comprise the input circuit of radio transmitter 301. The simplex circuit associated with the conductors 190 and 191 is connected from the mid-point of the primary winding of repeating coil 236 to an outward impulse regenerating system comprising relays 200, 205, 210 and 215. This relay set is operated responsive to impulses received from the central exchange over the simplex to operate the radio transmitter 301, and to connect the output of the dial tone oscillators 289, 290 to the input circuit of the transmitter 301. The relay arrangement is further effective to repeat the interruptions of the simplex circuit, by converting each impulse into two successive tones of 3000 and 2800 cycles, and superimposing these tones as modulations on the outgoing carrier of radio transmitter 301.

The radio receiver 228 and its associated squelch relay 250 are operated responsive to receipt of the carrier associated with the transmitter in any of the mobile sets such as the transmitter 600 in the illustrated mobile unit 500. The radio receiver and the squelch relay on operating place the radio transmitter 301 on the air, if this has not been previously accomplished, and initiate operation of the signal tone detector circuit 293. Squelch relay 250 is also operative to seize the signal-in line relay 110 in the trunk repeater 49, over a simplex arrangement extending over the inward conductors 194 and 195. When the incoming signal frequencies of 3000 cycles and 2800 cycles, modulating the carrier of the mobile unit transmitter, pass from radio receiver 228 to the line circuit 233 and the input circuit of the signal tone detector circuit 293, the tone detector 293 is thereupon operated to convert each combination of incoming tones into a single signal impulse. The inward impulse regenerator system comprising relays 260, 270, 275 and 280 operates responsive to operation of the pulse tone detector circuit 293 to interrupt the previously completed simplex circuit extending over the inward conductors 194 and 195 to the central office auxiliary equipment 179 and the trunk repeater 49 to control the apparatus associated therewith. The inward pulse regenerating circuit is of the type illustrated in the application of Roy W. Jones, Serial No. 694,045, filed August 30, 1946, Patent No. 2,500,286, granted March 14, 1950. Complete monitor supervision is provided by means of test jacks 220, 221, 222, 223, 224, and 225 whereby the lines may be tested for line conditions and characteristics in any direction by means of standard monitor equipment. Relay 240 is a remote control relay by means of which the attendant using apparatus in the central office auxiliary equipment 179 may control the power supply for the radio station control circuit 300. The outgoing speech frequencies received over conductors 190 and 191 are extended as previously mentioned over the repeating coil 236 to the low pass filter 285 which has a cut-off frequency of approximately 2600 cycles whereby the selected audio frequencies are then extended over the conductors 306 and 307 to the input circuit of the transmitter 301, and further to the transmitter modulation circuits located in the radio transmitter. Low pass filter 285 is provided to prevent voice frequencies from interfering with the dialling circuits. The radio transmitter 301 is designed to cooperate with radio receiver 400 in the mobile unit 500 over a common carrier channel. Likewise the radio transmitter 600 (Fig. 6) is tuned to a common channel with radio receiver 228 (Fig. 2) located in the radio station control circuit 300. The incoming speech frequencies pass from receiver 228 over line circuit 233, attenuation equalizer 233, and repeating coil 237 to the inward conductors 194 and 195.

Figure 3 illustrates the details of the power supply panel associated with the radio station control circuit 300. The power supply panel includes a master power switch 323 and pilot lamp 324 for indicating the position of the master switch. The illustrated stepping "on-off" switch 312 including motor magnet 311 and associated ratchet and cam wheels 313 and 314 is remotely controlled over conductor 309 to energize and deenergize the power supply panel as required. Pilot lamp 325 indicates the position of the remote control switch. Operation of switch 312 places the radio station control circuit 300 in the stand-by condition, that is the transmitter tube heaters are fully energized, but without anode voltage; and 48 volt direct current is supplied for the operation of the associated relays. Energization of the transformers 302', 328 and 329 by switch 312 accomplishes this result. Transmitter control relay 320 is operative from relay 205 to apply the 115 volt supply at the power panel to transformers 302 and 327. Transformer 327 and the associated vacuum tube 330 supply the necessary voltage for placing the tone oscillators 289, 290 and the tone detector 293 in the standby condition. Lamp 326 is operated whenever the high voltage supply circuit is energized, and serves as a warning to the personnel to observe all necessary safety precautions. Switches 333 and 336 test the remote control master switch functions in the radio station control circuit and are normally open.

Figures 4, 5, 6 and 7 illustrate the mobile apparatus, and more specifically, may be divided into dash control apparatus as shown in Figure 5, a transmitter receiver control unit as shown in Figures 4 and 6, and an out-of-range and call timer unit, as shown in Figure 7. The dash control apparatus comprises a telephone handset 501, a switchhook 503 associated with the telephone handset, an impulse dial 510, a master "on-off" switch 518, a "camp-on-busy" switch 519, and indicating lamps 514, 515, 516, and 517. Lamp 516 is lit whenever the "on-off" switch is in the operated position. Lamp 514 is illuminated whenever an incoming call is waiting to be answered. The lighting of lamp 515 indicates that the mobile set is in use (handset off), while the lighting of lamp 517 indicates that the mobile unit is beyond the operating range of the associated radio station control unit's carrier. The dash control apparatus is normally mounted as a unit within easy reach of the operator or driver of the mobile unit, the exact location being of course dependent on the type of vehicle involved. The transmitter-receiver control unit may be mounted in any free space, such as the luggage compartment of the vehicle, for example. The radio receiver 400 is responsive to receipt of the carrier wave from the radio transmitter 301 to operate an associated squelch relay 410, to prepare the mobile transmitter-receiver control circuit and the pulsing tone detector circuit for operation. The tone detector circuit comprises tubes 403 and 404 and their associated networks 418 and 419. The audio frequency output of the radio receiver 400 is connected to transformer 417 whereby the received modulation tones are extended to the tone detector circuit.

An impulse regenerating apparatus, connected to and operated by the tone detector, repeats an impulse each time the incoming tones are received in the proper sequence, in the proper timed relation, and in the proper combination of frequencies. This impulse regenerating apparatus comprises relays 440, 445, 450, and 455. A ten-point stepping switch 444, comprising release and motor magnets 458 and 459 and contact banks 464 and 465, is connected to the impulse regenerating arrangement and is operated responsive thereto. Connections to the contact banks 464 and 465 are made in such manner that signal relay 470 will be operated only when the switch is operated to each of two predetermined contacts in the banks, in a predetermined sequence. Each mobile unit is given a different call number, the arrangement in each unit being such that only the mobile unit having the bank contact connections corresponding to the dialled digits, will be signalled. The connections illustrated in Figure 4 are such that the switch 444 will cause operation of relay 460 responsive to an initial series of four impulses. The illustrated relay 470 will be operated only where the first series of pulses received contains four impulses, and the second series six impulses. Relay 470 is a signalling relay whose operation serves to inform the mobile subscriber of an incoming call.

Figure 6, in addition to the transmitter 600, also includes a power control relay 630, controlled by the hookswitch 503, for starting and stopping a dynamotor 650. The dynamotor 650 is the source of the high voltage supply for the radio transmitter 600, the said transmitter responding instantly to the application of the high voltage to place the mobile unit's carrier on the air. The relay 640 is an adapter relay which is arranged, upon operation, to instantly convert the pulse tone detector circuit comprising tubes 403 and 404 and their associated control circuit, into a pulse tone oscillator circuit. The relay 610 and 620 are pulsing relays controlled from the dial 510 to connect the signal tones from the tone oscillator circuits to the transmitter input circuit in a predetermined order for dialling over the carrier. Transformer 651, shown in the input circuit of the transmitter 600, is also connected to the handset 501, whereby the speech currents are also conducted to the radio transmitter for transmission purposes.

The timers shown in Figure 7 consist, as previously stated, of an out-of-range timer and a call timer. The out-of-range timer is a bi-metal thermal relay 700 having an operate time of approximately 2 seconds, which is connected so as to operate whenever the mobile unit attempts to initiate a call while outside the operating area of the fixed radio station. This causes the mobile unit's radio transmitter to be cut off the air, and lights the dash lamp 517 as notice of the out of range condition. The call timer comprises a motor and reduction gear unit 715, a shaft 725, mounting two cams 720 and 730, and a magnetic clutch 716 for connecting the shaft to the gear reduction unit as required. This timer is arranged to interrupt all incoming or outgoing calls after approximtaely five minutes. It also causes a warning tone to be given to the mobile subscriber after some 4½ minutes. This arrangement eliminates the danger of monopoly of the channel by prolonged conversations, or as a result of accidental removal of the telephone receiver from its hook in a mobile unit.

Figure 7A shows the same two timers in a different and alternative form, in which only four standard relays controlled by various timing resistors, having negative temperature coefficients, are employed. In this figure, which may be directly substituted for Figure 7, relays 740, 750, 760 and 770, and the resistors 746, 747, 758, 768, and 774 constitute the call timer, while relay 760 and the resistor 767 serve as the "out-of-range" timer.

*Placing apparatus in stand-by condition*

Primarily, the apparatus in the radio station control circuit 300 and the mobile radio sets such as the illustrated set 500 are maintained in a normal stand-by condition while in use. Essentially, the stand-by condition involves maintenance of the receivers in the fully operative state and the transmitter tube heaters energized, but without anode voltage. Therefore, subsequent energization of the transmitter high voltage supply circuit will instantaneously place the transmitter on the air. Further the stand-by condition requires a direct current battery supply of 48 volts in the grounded positive terminal, for relay operation. In the fixed radio station control circuit 300 the stand-by condition additionally includes energization of the heater supply for the vacuum tubes in the tone oscillator and tone detector circuits 289, 290 and 293 respectively. The first step in preparing the apparatus for use is the closing of the main power supply in the radio station control circuit by means of master power switch 323. Subsequently the remote control master switch 312 must be operated whereby the associated contacts 315 are closed to supply the necessary power for energizing transformers 302′, 328 and 329. The transmitter, the dial tone oscillator and the dial tone detector circuits are thereby placed in the stand-by condition. Operation of master switch 312 is accomplished from the central office auxiliary equipment 179 by momentarily operating switch 198 which completes a loop circuit to relay 240 over the audio frequency lines 194 and 195 extending between the central office auxiliary equipment 179 and the radio station control circuit 300. Assuming the contacts 315 associated with switch 312 are in the open condition at this time operation of the switch 198 comprising contacts 199, 199′ in the central office auxiliary equipment will momentarily disconnect the incoming leads 194 and 195 from the supervisory relay 180 and close a loop circuit extending from exchange battery and ground over resistance 188 and lamp 187, upper contacts of springs 199, and lower contacts of springs 199′, conductors 189 and 189′, the lower windings of hybrid coil 183, contacts on test jacks 196 and 197, conductors 194 and 195, contacts on test jacks 221 and 222, primary windings of repeating coil 237, contacts 247 and 249 and through the upper and lower windings of relay 249 and contacts 242. Lamp 187 will not light over this circuit due to the high resistance, but relay 240 operates responsive to completion of the loop circuit, and at its contacts 242 opens the normal series connection between the windings of relay 240, while at its contacts 242′ it closes the tip side of the line to ground through a resistor to light the lamp 187 as an indication to the attendant that the relay 240 has operated. Relay 240 also, at its contacts 244 opens the normal connection of the simplex circuit extending between the radio station control circuit 300 and the trunk repeater circuit 49, and at its contacts 243 applies battery to the ring side of the line through a protective resistor to further maintain its own circuit. Relay 240 further, at its contacts 241 completes an operating circuit for the motor magnet 311 associated with the on-off switch 312. Switch 312 comprises a motor magnet 311 with an associated pawl arm, a ratchet cam 313, a cam 314 having notched indentations at regular intervals about its outer periphery, a shaft connecting cams 313 and 314, and a microswitch 351 with associated contacts 315. On energization of the motor magnet 311, the associated pawl is attracted by the motor magnet to engage a new tooth on the ratchet 313. Upon release of the key 198 by the attendant relay 240 restores, and causes the release of the motor magnet 311. When the motor magnet 311 deenergizes the pawl associated therewith is returned to its normal position by a restoring spring 353. In returning to its normal position the pawl 352 is forced against the newly engaged tooth on the ratchet wheel 313, which is thereby rotated one step in a clockwise direction, and causes the cam 314 to advance similarly, through the common drive shaft. The outer periphery of cam 314 is indented at regularly spaced intervals, each step of the cam causing the high points on the periphery to advance to the positions just vacated by the preceding indentations. Micro-switch 351 comprises a switch arm 354 which is mounted to ride on the outer periphery of cam 314. A small curvature located on the extreme end of this lever alternately engages an indented portion of the cam periphery and a smooth portion of the cam periphery at successive steps of the cam. When the tip of the switch arm is in engagement with an indented portion of the cam periphery, contacts 315 associated with micro-switch 351 are in the open position. Assuming the switch is in the open condition, operation of the cam 314 one step in a clockwise direction causes the curvature on switch arm 354 to engage a smooth portion of the periphery of cam 314 and close contacts 315 of micro-switch 351. A circuit is thereupon completed for energizing transformers 302′, 328 and 329 in an obvious circuit from the master power supply. Energization of these transformers supplies the required voltage for placing the radio transmitter 301, pulse tone oscillator 289—290, and pulse tone detector 293 in a stand-by condition. It is obvious that a subsequent operation of the switch 198 will cause a similar momentary operation of relay 240 and consequent energization and de-energization of motor magnet 311 to cause cams 313 and 314 to open contacts 315 on microswitch 351, and to thereby deenergize the radio station control circuit 300.

The mobile set 500 is placed in the stand-by condition by operation of the master switch 518 located in the dial panel (Fig. 5) to thereby supply battery potential to the mobile unit.

*Exchange subscriber call to mobile unit*

A better understanding of the connections and arrangements of the apparatus incorporated in the illustrated mobile telephone system, as previously described, will be facilitated from a consideration of the extension of connections involving the automatic exchange 1, the radio station control circuit 300, and the mobile set 500.

Considering, now, the extension of a connection between the automatic exchange 1 and the mobile set 500 and assuming that a call is initiated at the subscriber substation T in the automatic exchange 1, the line circuit 7 individual to the subscriber line 2 extending to the calling subscriber sub-station T operates in order to place battery potential upon the control conductor 5 of the subscriber line 2, and ground potential upon the start conductor 8 extending to the distributor 9 associated with the group of finder-selector links, including the link illustrated, and comprising the finder 10 and the selector 11. The distributor 9 assigns an idle link of the finder-selector group mentioned, such, for example, as that illustrated; and initiates operation of the finder 10 thereof, whereby the finder operates to seize the subscriber line 2 extending to the calling subscriber sub-station T. This brings about further operation of the line circuit 7 whereupon ground potential is placed upon the control conductor 6 of the subscriber line 2 in order to mark the subscriber line 2 as busy to the connectors of the group having access thereto, including the connector 22. Also the line circuit 7 releases the distributor 9 and the selector 11 is conditioned to receive the first digit. Dial tone is returned to subscriber T on seizure of the selector to signal the subscriber to proceed with the dialling operation.

Assuming the subscriber at substation T now dials the first digit into the selector 11, to select the radio level, the selector 11 operates in order to select first, a corresponding group of trunks, and then an idle trunk therein. In this case, since with a single channel, only one radio call can be made at a time, the selector 11 will select the outgoing trunk 12 extending to the trunk repeater circuit 49, whereby there is completed a loop circuit extending from the calling subscriber sub-station T to the line relay 60 in the repeater circuit 49, while the control conductor 16 of the selector 11 is also extended to the repeater 49, for a purpose more fully explained hereinafter. It is noted that the outgoing trunk 12 is normally marked as idle to the selector 11 by the application of battery potential thereon through impedance 70, over a path including the contacts 97 and 165, and control conductor 16. The loop circuit mentioned, extends from ground by way of the lower winding of line relay 60 and contacts 52 to the line conductor 14 of the outgoing trunk 12, and from battery by way of the upper winding of line relay 60 and contacts 54 to the line conductor 15 of the outgoing trunk 12, and then by way of trunk 12, the selector 11 and finder 10, and the subscriber line 2 to the calling subscriber substation T.

When this loop circuit is thus completed, the line relay 60 operates to complete at the contacts 61 a path for applying ground potential by way of resistor 177 to the signal-out conductor 170 extending to the central office auxiliary equipment 179 and further to the radio station control circuit 300, in order to bring about the operation of the pulsing relay 200 therein in a manner to be described more fully hereinafter. Also the line relay 60 interrupts at the contacts 62 a termination circuit which includes resistor 174, condenser 175 and extends over contacts 101, 62 across the line conductors 171 and 172 extending between the trunk repeater circuit 49 and the central office auxiliary equipment 179. Further, the line relay 60 completes at the contacts 63, an obvious circuit for operating the hold relay 160. Upon operating, the hold relay 160 interrupts, at the contacts 165, the previously traced path for applying battery potential by way of impedance 70 to the control conductor 16 of the outgoing trunk 12, and completes at the contact 166 a path for applying ground potential to the control conductor 16 of the outgoing trunk 12. Ground potential applied to the control conductor 16 of the outgoing trunk 12 marks the outgoing trunk 12 as busy to the other selectors. The signal-out circuit from line relay 60 extends from ground over resistance 177 through contacts 61, over the signal-out conductor 170 and the simplex circuit connected to the repeating coil 184, the monitor keys 193, 192 and their associated contacts, conductors 190 and 191, test jacks 220, 223 and the contacts associated therewith, through the simplex connection on repeater 236, to line relay 200 in the radio station control circuit 300. Relay 200 operates, and at its contacts 201 completes a circuit to a hold relay 205 which is of a slow-to-release type. Relay 205 operates and at its contacts 206 completes an operating circuit from ground over conductor 310 to transmitter control relay 320 and battery. Relay 205 at its contacts 207, prepares a self-holding circuit and a holding circuit for relay 210, and at its contacts 209 opens a point in the grid bias control circuit for tone detector circuit 293, to prevent operation of the detector circuit 293 responsive to impulses received over receiver 228 from a mobile unit 500. Relay 320 operates and at its contacts 321 completes a circuit from the 115 volt 60 cycle supply 322 over master power switch 323 to the transmitter high voltage control circuit. In more detail the circuit may be traced over the right arm of switch 323, conductors 341, 345, 346, and 347, contacts 321, conductor 348 to the primary of the transformer 302 feeding the high voltage rectifier circuit (not shown) of the radio transmitter 301, and conductor 340 back to the left hand side of the master switch 323. Activation of the transmitter high voltage supply places the carrier of the transmitter 301 on the air in the conventional manner. Also, circuits in the transmitter, not shown, complete an operating circuit by way of conductors 304 and contacts 253 to relay 245. Relay 245 operates, and at its contacts 246 and 248, applies ground and battery through protective resistor 239, to a circuit including the primary windings of repeating coil 237, test jacks 221 and 222 and their associated contacts, conductors 194 and 195, jacks 196 and 197 and their associated contacts, through the hybrid circuit 183, conductors 189 and 189′ and contacts 199 and 199′ on the start key 198 to relay 180. Relay 245 further, at its contacts 247 and 249 opens the operating circuit for relay 240 temporarily.

The windings on relay 180 are arranged to aid each other when they are serially connected in a loop circuit to thereby cause operation of the relay, and to oppose each other whenever a parallel circuit is completed through them. Since the foregoing circuit from the contacts of relay 245 passes serially through the windings of relay 180, the latter relay operates. Relay 110 in the trunk repeater 49 is also energized momentarily through relay 180 by way of contacts 182 and conductor 173, but is made slightly slow-to-operate by the use of a small copper slug around the armature end of the core. Relay 180 upon operating, opens its contacts 182, thereby opening the circuit of relay 110 before the latter can operate. Relay 180 also, at its contacts 181 connects a characteristic dial tone on the calling line, by way of conductor 172, as notice to the calling subscriber T that the control station's carrier is on the air, and that the dialing operation may be continued.

Responsive to transmission of the carrier wave by the radio transmitter 301 at the control station, circuits (not shown) associated with the radio receivers 400 in all of the mobile units, will cause operation of the associated squelch relay 410. Relay 410, at its contacts 411 closes the plate supply circuit to the pulse tone detector unit, comprising tubes 403 and 404 and their associated components. Contacts 412 and 414 of relay 410 at the same time apply holding ground to various relay circuits of the mobile unit.

*Selecting mobile unit*

The equipment is now conditioned for the subscriber T to select the desired mobile unit such as the unit 500, by a further dialing operation. Each of the mobile units has an assigned directory number and may be selectively signalled in a manner to be set forth herein. Referring to Figure 4, the illustrated connections to the contact banks 464 and 465 are such that the illustrated mobile unit 500 will be signalled responsive to the dialing of the digits "46".

Assuming that subscriber T wishes to establish a call to this illustrated mobile unit, he will now dial the digit "4" whereby the previously traced loop circuit which extends from subscriber substation T over trunk circuit 2, finder 10, selector 11, and trunk circuit 12 to line relay 60 in the trunk repeater 49 is opened and closed four times. Relay 60 (Fig. 1B) is released and energized four times in response thereto, and at its contacts 61 opens and closes the circuit extending over the signal-out conductor 170 and the connecting simplex circuit of repeating coils 184 and 236 to pulsing relay 200. Relay 200 releases and energizes four times responsive to the impulses received over this circuit. Responsive to the open interval of the first impulse, relay 200 releases, and at its contacts 202, completes an operating circuit for relay 210, over a circuit including contacts 202, 208, and 219. Relay 210 operates, and at its contacts 212, completes a circuit from the secondary of transformer 287 of the pulse tone oscillator 289 to resistor 257. Resistor 257 is in series with the audio frequency input circuit which passes over conductors 306 and 307 to the transmitter 301. This causes a 3000 cycle tone obtained from the dial tone oscillator arrangement 289 to be impressed upon the transmitter audio frequency input whereby it is further imposed upon the radio carrier by circuits therein (not shown) as a 3000 cycle modulation of the carrier. Relay 210 also, at its contacts 213 completes a self-holding circuit over contacts 207, 213 and 219 and at its contacts 214 prepares an operating circuit for relay 215. It is obvious that the radio station control circuit is transmitting a 3000 cycle modulation on its carrier to represent the open period of a transmitted impulse. Responsive to the succeeding make period of the first impulse from the dial of subscriber T over the previously traced circuit, relay 200 re-energizes, and at its contacts 201 completes an energizing circuit for relay 215 over contacts 214. Relay 200 also, at its contacts 201 re-energizes relay 205, and at its contacts 202 opens the original operating circuit of relay 210. Relay 210 holds however, over a circuit including contacts 219, 213 and 207. Relay 205 remains operated for the series of impulses due to being of the slow-to-release type. Relay 215 operates and at its contacts 217 connects the secondary winding of the transformer 291 which is associated with the dial tone oscillator 290, to resistor 258. Resistor 258 is also connected to the audio frequency whereby a 2800 cycle tone obtained from the oscillator 290 is applied to the transmitter audio frequency input comprising conductors 306 and 307, by resistor 258. By means of conventional modulating equipment (not shown) in the transmitter 301, the transmitter carrier is modulated with 2800 cycles by the radio transmitter to represent the make period of a transmitted impulse. Relay 215, at its contacts 218 completes a self-holding circuit over the contacts 207, 218, and 214, and at its contacts 219 opens the holding circuit to relay 210. Relay 210 releases and at its contacts 212 disconnects the 3000 cycle modulation tone from the transmitter audio frequency imput, at its contacts 213 opens a further point in its self-holding circuit, and at its contacts 214 opens the operating circuit to relay 215. Relay 215 releases, at its contacts 217 disconnects the 2800 cycle modulation tone from the audio imput circuit for the transmitter, at its contacts 218 opens a further point in its holding circuit, and at its contacts 219 prepares the operating circuit for relay 210 whereby the impulse relay arrangement comprising relays 200, 205, 210 and 215 is conditioned for receipt of a subsequent impulse. The impulse relay arrangement operates in a like manner for each of the four impulses received. It is obvious that each impulse received is transmitted over the radio carrier as a 3000 cycle tone and a 2800 cycle tone modulation of the carrier. It is important to note that relay 210 is shunted by resistance 226 which causes relay 210 to remain operated for a short interval of time after its holding circuit is interrupted by relay 215 at its contacts 219, whereby the carrier is modulated simultaneously for a brief interval of time by a combination of 3000 cycle and 2800 tones, for reasons to be more fully described at a later point herein.

The tone oscillator circuits 289 and 290 are of the conventional type, the oscillator 289 is effective to produce a 3000 cycle current in the secondary winding of its transformer 287, and the oscillator 290 is effective to produce a 2800 cycle current in the secondary winding of its transformer 291. Each oscillator comprises, essentially, a conventional pentode tube arranged with a transformer and resistance and condenser elements, so as to produce the desired frequency in the secondary winding of the transformer. In more detail, oscillator 289 comprises resistances 283 and 286 which are provided to reduce the effect of the grid of the pentode tube 288 as a load upon the tuned circuit 284′ of the oscillator arrangement, whereby the frequency stability is improved in the event of operational changes in the field application. The condenser 284 bridges resistance 283 to increase the feedback voltage reaching the grid, the D. C. resistance of the grid circuit at the same time being maintained at as high a level as possible to keep the loading of the tuned circuit 284′ light, for efficient stability control. Bias for the tube 288 is obtained from the drop across resistance 286 in the grid circuit. An obvious circuit exists from the plate to the transformer 287 whereby the 3000 cycle output of the pentode tube is impressed upon the primary winding of the transformer 287 and further induced into the secondary winding for the purpose above specified. The circuit for adjusting the output of the arrangement to the desired frequency comprises the transformer 287 and the condenser 284′ the values of which may be changed to thereby change the frequency output. The oscillator 290 comprises elements similar to those contained in the oscillator 289, the values of the elements of the tuned circuits in this case being such as to produce the required 2800 cycle output.

Referring now to Fig. 4, the carrier, modulated with the two frequency tones is received by all of the antennas 400′ associated with the receivers 400. The modulated currents thereupon are caused to appear across the audio frequency output of the receiver 400. This output circuit is connected to the primary of the transformer 417 which further induces the tones into its secondary winding. The transformer secondary winding is connected over conductors 656 and 657, contacts 648 and 649, and conductors 664 and 665 to the tuned circuits 418 and 419 of the mobile unit tone detector, which are further connected over conductor 658 and contacts 646, to ground. The tuned circuit 418 comprises transformer 401′ and condenser 401 in arranged relation whereby they are effective to select the incoming 3000 cycle tone and apply it to the grid of tube 403. Tube 403 is operated with its grid biased negative close to cut-off so that when the tone selected by the associated tuned circuit 418 appears on the grid of the tube, the tube will conduct. The tuned circuit 419, comprising transformer 402′ and condenser 402 is tuned to a frequency of 2800 cycles and is effective to select the incoming 2800 cycle tone and apply it to the grid of tube 404. Inasmuch as the 3000 cycle frequency is received first from the transmitting source at the fixed control station, the tube 403 conducts first, and causes operation of relay 445 which is connected in the plate circuit of tube 403 over conductor 666, contacts 642, conductor 671, through relay 445 and resistance bank 443, to the cathode of tube 403. When the 2800 cycle tone is received from the control station transmitter 301, just prior to termination of the 3000 cycle tone the 2800 cycle tone is induced into the secondary of the transformer 417 and thus into the tuned circuits 418 and 419 over the previously traced circuit to ground at contacts 646. The tuned circuit 419 is now effective to select the 2800 cycle tone and impress it upon the grid of tube 404. Tube 404 is also normally provided with a negative grid bias close to cut-off, so that when the tone selected by tuned circuit 419 appears on the grid of tube 404, the tube conducts, and effects operation of relay 440 which is located in the plate circuit of tube 404. This circuit extends from the plate of tube 404 over conductor 667, contacts 644, conductor 670, relay 440 and through the resistance network 443 to the cathode of tube 404.

Relay 445 operates responsive to tube 403 being rendered conductive, and at its contacts 446 completes an operating circuit for relay 450 extending from contacts 412 of the operated squelch relay 410, over contacts 426, conductor 437, and contacts 446, 441, to relay 450. Relay 450 operates, and at its contacts 451 completes an operating circuit for hold relay 455. Relay 450 also, at its contacts 452 prepares a circuit to the motor magnet 459 of the rotary switch 444 and at its contacts 453 completes a condenser short-circuit for its own winding whereby it will be slow to release. Hold relay 455 operates, at its contacts 456 completes a circuit to the rotary switch release magnet 458, and at its contacts 457 opens a point in the circuit to the contact banks 464 and 465. Release magnet 458 operates to engage the holding pawl of the rotary switch. Rotary switch 444 is a small ratchet drive stepping switch having a pair of contact banks 464 and 465, each contact bank having 10 contacts. A holding pawl (not shown) having two positions, is regulated to each of these positions by the release magnet 458. When the release magnet 458 is energized, the holding pawl engages the ratchet to hold the wipers at the point to which they have been operated. Upon deenergization of the release magnet, the holding pawl is disengaged and the switch wipers restore to their normal position under spring tension.

When the second modulation of the carrier is received to operate tube 404 and its associated relay 440 in the manner described heretofore, relay 440 operates, and at its contacts 441 and 442 opens the operating circuit to relay 450, and completes an operating circuit to the operating magnet 459 of the rotary switch 444. The operating circuit for magnet 459 extends over contacts 412, 426, conductor 437, contacts 446, 442, 452 to the magnet 459. Motor magnet 459 operates to cause the wipers 464′ and 465′ to advance one step clockwise in the banks 464 and 465 in a well known manner. Inasmuch as the release magnet 458 is operated, the holding pawl of the rotary switch will engage the ratchet to hold the wipers on the first contact.

It should be noted that the circuit to the motor magnet 459 of the rotary switch will be completed only if relays 440, 445 and 450 are operated. Further, the circuit will be completed only momentarily in that the operating circuit to relay 450 is opened at contacts 441 whenever relay 440 is operated, thereby effecting release of relay 450 and consequent interruption of the aforetraced operating circuit. Since the circuit is completed only when relay 440 is operated, it is obvious that the momentary pulse to motor magnet 459 will have a time duration equivalent to the release period of relay 450, as determined by the discharge time of condenser 453′. The purpose of transmitting two successive tones per pulse to operate two relays in a definite sequence is to reduce dialling interference, and to prevent needless operation of the rotary switch. For example, whenever a crash of static is received by the receiver 400, the resultant transient currents in each of the tuned circuits would appear simultaneously upon the grids of the tubes 403 and 404 to render these conductive. Relays 440 and 445 would thereupon operate simultaneously and continue in operation for the interval of time that the interference was effective. However, inasmuch as relay 440 is arranged at its contacts 441 to open the circuit to relay 450, relay 450 can not operate whenever the relays 440 and 445 are initially simultaneously operated, and the motor magnet of the rotary switch will not receive a false impulse.

The release magnet 458 will remain operated for the series of impulses comprising a received digit inasmuch as hold relay 455 remains operated due to being of a slow to release nature. The relays 440 and 445 release upon removal of the tones at the end of each pulse, and re-operate as described to re-operate relay 450 at each succeeding impulse. Relay 450, at each energization, will complete the operating circuit to motor magnet 459 to cause the rotary switch to advance one step for each impulse. Therefore, it is obvious that the wipers 464′ and 465′ will be stepped to the fourth contact of banks 464 and 465 responsive to the digit "4" which has been dialled by subscriber T. When the wipers reach the fourth contact, they are retained in this position by the holding pawl, which is controlled by the operated release magnet 458 as heretofore mentioned. After a short interval of time following the receipt of the last impulse of the series comprising the transmitted digit "4" and the final release of relay 450, the slow-releasing hold relay 455 also restores. Relay 455, at its contacts 457, which are arranged to make prior to the break of its contacts 456, completes a circuit from ground over contacts 412, 426, conductor 437, contacts 457, 461, wiper 464′ and the 4th contact of bank 464 to relay 460. Hold relay 455 next opens its contacts 456 to effect deenergization of release magnet 458. When release magnet 458 deenergizes, the holding pawl is disengaged and the rotary switch is returned by mechanical spring action (not shown) to its normal position. Relay 460 operates responsive to the temporary ground received over the previously traced circuit, and at its make first contacts 463 completes a self-holding circuit over contacts 412 of the operated squelch relay 410, contacts 426, conductor 437, and contacts 463. Relay 460 also, at its contacts 461 opens a portion of its operating circuit, at its contacts 462 prepares an operating circuit for relay 470.

When the succeeding digit 6 is dialled by the subscriber T, the equipment in the automatic exchange is effective to repeat the digit comprising 6 impulses to the control station. The equipment therein in turn, causes 6 modulated impulses to be transmitted over the carrier to the mobile units. These incoming impulses are received by the radio receiver 400 and are converted similarly into direct current pulses for the operation of motor magnet 459 of the rotary switch, by the pulsing relays 440, 445, 450, 455. The wipers of the rotary switch are thereupon, stepped to the sixth contact of the wiper banks 464 and 465. Shortly after termination of the sixth impulse hold relay 455 releases, as before. Relay 455, at its make first contacts 457, completes a circuit over contacts 412, 426, conductor 437, contacts 457, 462, wiper 465′ and the 6th contact of bank 465 to relay 470. Relay 455, at its contacts 456, then opens the circuit to release magnet 458, which deenergizes and disengages the holding pawl for the rotary switch, to effect release of the rotary switch to its normal position. Relay 470 operates, and at its make first contacts 471, completes a self-holding circuit over contacts 412, conductor 492, and contacts 471. Relay 470 at its contacts 472, completes a circuit to light the "incoming call" lamp 514 over conductor 520, switch 518, and conductor 525, as a visual indication to the subscriber in the mobile unit that there is an incoming call awaiting his answer. Relay 470 also, at its contacts 473 and 475, completes a circuit from the vibratory side of the high voltage rectifier unit (not shown) of the receiver 400, over conductor 406, contacts 427, conductor 490, contacts 475 and conductor 491 to the input circuit of the output amplifier stage (not shown) of the receiver 400, which delivers the tone amplified back through the amplifier output leads of the receiver over conductor 489, contacts 473, conductor 522 to the handset receiver connection, as an audible signal to the mobile subscriber. This signal, which is applied to the handset receiver, is a tone of very high level, said signal being merely one form of signal that may be utilized for such purpose.

*Mobile subscriber answers*

Responsive to the audible and visual signals received by the subscriber located in the mobile unit 500 which has been selectively seized by subscriber T, the called subscriber lifts his handset 501 from hook 503 whereby a circuit is completed to relay 420 over contacts 412, conductor 492, contacts 476, conductor 523, contacts 504, conductor 526, contacts 704, and 734, and conductor 707 to relay 420. A branch of this circuit also extends through contacts 733 to the motor 715 of the call timer to start operation thereof. At the same time, contacts 506 close a direct circuit over conductor 529 to clutch magnet 716. Clutch magnet 716 is thereby energized and connects the motor and reduction gear unit 715 to the shaft 725 which mounts cams 720 and 730 whereby the said cams are driven in a clockwise direction at a rate of speed approximating one revolution in five minutes. In addition to the foregoing, the removal of the handset 501 also lights the "in use" lamp 515 on the dash, over contacts 504 and 505.

Relay 420 operates, and at its contacts 421, completes a circuit for power relay 630 over contacts 412, 421, and conductor 654. Relay 420 also, at its contacts 422 disconnects the audio frequency output circuit of radio receiver 400 from the transformer 417 leading to the pulse detecting circuit, and connects the said audio frequency output of the receiver 400 over contacts 423, conductor 522, to the handset receiver circuit. Relay 420 at its contacts 424, opens the plate supply to the tone detector vacuum tubes 403 and 404 thereby preventing any possible operation of the impulse responsive equipment as a result of incoming transient tones. Relay 420 at its contacts 426, opens the holding circuit for relay 460, and at its contacts 427 opens the tone signal circuit to thereby terminate the audible signal to the mobile subscriber. At its contacts 428 relay 420 completes a self holding circuit over contacts 412, contacts 428, conductor 523, contacts 504, conductor 526, contacts 704 and 734 and conductor 707.

Relay 630 operates and at its contacts 631, completes an operating circuit for the dynamotor equipment 650 to thereby supply the radio transmitter 600 with the high voltage necessary for generation of the transmitter's carrier. At the same time, direct current is supplied to the handset transmitter circuit from battery through relay 630, over conductor 632, induction coil 633, the primary of transformer coil 651 and conductor 672 and the handset transmitter to conductor 528 and ground. The outgoing speech circuit now comprises the handset 501, conductor 672, the primary of transformer 651 and condenser 634. The outgoing speech is thus induced into the transformer secondary which is connected to the radio transmitter modulation circuit. The mobile unit's carrier is placed on the air responsive to operation of the dynamotor 650 and the consequent energization of the high voltage supply circuit for the transmitter.

In the fixed radio station control circuit, radio receiver 228 intercepts the transmitted mobile-unit carrier and squelch relay 250 is operated therefrom over conductors 229 responsive to receipt of this carrier. Relay 250 upon operating its contacts 251 completes a multiple operating circuit for relay 320, and at its contacts 253 opens the operating circuit for relay 245. Relay 245 thereupon restores, at its contacts 246 and 248 opens the operating circuit for relay 180, and at its contacts 247 and 249 prepares an operating circuit for signal-in relay 110 (Fig. 1B). Relay 180 releases, removes dial tone, and at its contacts 182 completes a circuit for signal-in relay 110 over the simplex circuit comprising contacts 254, 282, 278, contacts 244 and 242, both windings of relay 240 in parallel, contacts 249 and 247, both secondary windings of repeating coil 237, the contacts of monitor jacks 221 and 222, conductors 195 and 194, contacts of jacks 196 and 197, lower windings of repeating coil 183, conductors 189′ and 189, contacts of key 198, both windings of relay 189 in parallel, contacts 182, and conductor 173 to relay 110. Relays 240 and 180 will not operate in this circuit due to their windings being energized in opposition, but relay 110 operates, and completes, at contacts 113, a circuit for operating hold relay 150.

Upon operating, the hold relay 150 completes at contacts 152 a circuit for operating the slow to operate relay 140 from contacts 162. Upon operating, relay 140 completes, at contacts 145, a secondary holding circuit including contacts 167 for maintaining operated the hold relay 160. Further, relay 140 completes at contacts 144 a circuit including contacts 113 for operating reverse battery relay 50. Upon operating, the reverse battery relay 50 reverses at contacts 51, 52, 53 and 54 polarity of the outgoing trunk 12 with respect to the line relay 60, which reversal of polarity may be utilized in the finder-selector line illustrated and included in the loop circuit extending to the calling subscriber substation T for metering or supervisory purposes.

At this time a talking connection has been completed from the calling subscriber T over the automatic exchange 1, the repeater 49, the central office auxiliary equipment 179, radio station control circuit 300, to the mobile unit set 500. The outward talking circuit extends from subscriber sub-station T over conductors 3 and 4, finder 10, selector 11, conductors 14, 15 of trunk circuit 12, contacts 51 and 53, 93 and 95, conductors 171 and 172, repeating coil 183, trunk circuit 185, repeating coil 184, monitor jacks 192 and 193, conductors 190 and 191, monitor jacks 220 and 223, repeating coil 236, through the low pass filter 285, and conductors 306 and 307 to the audio frequency input to transmitter 301, whereby the audio frequencies are impressed upon the carrier and transmitted to the radio receiver 400 in the mobile unit set 500, and whence they appear across the audio frequency output and thence over contacts 423, and conductor 522 to the receiver of the handset 501. Speech impressed upon the transmitter of the handset 501 by the called subscriber is transmitted over conductor 672, to the primary winding of transformer 651, from which it is induced into the secondary of transformer 651 and to the audio frequency input of radio transmitter 600, from whence it is superimposed upon the transmitter carrier and enters the air over antenna 600′. Radio receiver 228 located in radio station control circuit 300 receives the incoming modulated carrier and impresses the voice currents on the conductors 233, which are connected to the primary winding of transformer 237, whereupon the voice signals are inducted into the secondary of transformer 237 and extended over monitor jacks 221, 222, conductors 194 and 195, jacks 196 and 197 to the hybrid repeating coil 183, whereupon they are induced into the upper windings of the hybrid coil and transmitted over conductors 171 and 172, contacts 93 and 95, contacts 53 and 51, conductors 14 and 15 of trunk circuit 12, selector 11, finder 10, conductors 3 and 4 of the line 2 to the substation T.

*Normal release*

At the conclusion of the conversation, assuming that the subscriber at the calling subscriber sub-station T in the automatic exchange 1 replaces the receiver of his telephone instrument first, the loop circuit extending between the calling subscriber sub-station T and the line relay 60 in the trunk circuit 12 is interrupted, causing the latter relay to restore. Upon restoring, the line relay 60 completes, at contacts 62, the previously traced termination circuit including resistor 174, contacts 101, 62, condenser 175, across line conductors 171 and 172, which extend between the trunk circuit 12 and the hybrid coil 183 and the balancing network 186 in the central office auxiliary equipment 179. Also the line relay 60 interrupts, at contacts 61 the previously traced circuit to the signal-out conductor 170, to thereby bring about restoration of pulsing relay 200 in the radio station control circuit and the consequent release of relay 205 shortly thereafter. Relay 205 in releasing opens one of the holding circuits for relay 320 at its contacts 206. However, relay 320 is held operated over contacts 251 on squelch relay 250, which is kept operated by the mobile unit's carrier.

When the called subscriber at the mobile set 500 replaces the handset 501 on its associated switch hook 503, the previously mentioned circuits for holding relay 420 and the timer operated are interrupted, at contacts 504 and 506. Relay 420 thereupon restores, at its contacts 421 opens the operating circuit for relay 630, at its contacts 423 opens the connection from the audio frequency output of radio receiver 400 to the handset 501, at its contacts 422 reconnects the audio frequency output to the transformer 417 in the tone detector input circuit, and at its contacts 424 reconnects battery supply to the plate circuit in the vacuum tubes 403 and 404 of the tone detector. The timer motor is thereby stopped and the clutch 716 disengaged. Return spring 718 thereupon returns the cams 720 and 730 to the normal, illustrated position. Relay 630 releases, whereby the high voltage supply to radio transmitter 600 is opened and the mobile unit's carrier ceases to be transmitted by radio transmitter 600.

Squelch relay 250 associated with radio receiver 228 in the radio station control circuit 300 releases, responsive to removal of the mobile unit's carrier from the air, and at its contacts 251 opens the operating circuit for power relay 320. Relay 320 then releases, and at its contacts 321 opens the supply circuit for the high voltage rectifier circuit of the transmitter 301 to thereby remove the fixed station's carrier from the air. Relay 250 also, at its contacts 254, opens the operating circuit for relay 110. Relay 110 releases and at its contacts 113, opens the holding circuits for relays 150 and 50. Relay 50 restores immediately and the hold relay 150 restores shortly thereafter, it being of the slow to release type, due to having a copper sleeve over its core. Upon restoring, the reverse battery relay 50 re-establishes at contacts 51, 52, 53 and 54, the normal polarity of the outgoing trunk 12 with respect to the line relay 60 in the trunk circuit. The hold relay 150 upon restoring, interrupts, at contacts 152, the holding circuit for the relay 140. Relay 140 then restores and interrupts at contacts 145, the previously traced circuit for holding relay 160 operated, whereby the latter relay also releases, after a short delay, it being likewise of the slow to release type. Hold relay 160 upon restoring, at contacts 166 removes ground from test conductor 16, and recompletes, at its contacts 165, the circuit for applying battery potential by way of impedance 70, contacts 97, 165, to the said test conductor 16 of outgoing trunk 12. When ground potential is removed from the control or test conductor 16 of the outgoing trunk 12, the selector 11 and finder 10 are released, and the application of battery potential to the control conductor 16 marks the outgoing trunk 12 as idle to the outgoing selectors in the group including the outgoing selector 11 having access thereto. When the finder 10 is thus released, ground potential is removed from control conductor 5 of the subscriber line causing release of the line circuit 7 to apply battery potential to the control conductor 6 thereof whereby subscriber line 2 extending to the subscriber sub-station T is marked as idle to the connectors in the group including the connector 22 having access thereto.

It is now obvious that the radio control station equipment will remain energized on a call initiated at the automatic exchange, and the carrier transmitted by radio transmitter 301 will remain on the air until the last party releases, the control relay 320 being maintained operated either over contacts 206 or contacts 251. Responsive to the carrier transmitted by the transmitter 301 being removed from the air, squelch relay 410 associated with the radio receiver 400 in the mobile unit 500 restores, and at its contacts 412 removes the holding ground from conductor 492 whereupon relay 470 is restored and the set is once more in normal condition. At this time all of the equipment employed in the established connection between the calling subscriber substation T, in the automatic exchange 1, the central office auxiliary equipment 179, radio station control circuit 300 and the mobile set 500 is completely released and available for further use. The mobile unit's "In use" lamp 514 is extinguished when the mobile subscriber restores his handset on the hook, and the "Incoming call" lamp 515 is extinguished when relay 470 restores.

Should the called mobile subscriber hang up first, on such a call, the restoration of the handset 501 on the hookswitch extinguishes the "In use" lamp 515, at contacts 505, and at contacts 504 and 506 causes the release of relay 420 and the call timer, as before. Relay 420 in turn, restores the tone detector circuits, and at contacts 421 opens the circuit to the power relay 630, which accordingly restores, and takes the mobile unit's transmitter 600 and its carrier off the air. Relays 410 and 470 however, remain operated, and the incoming call lamp 514 remains lighted. The mobile subscriber is now locked out, since he cannot re-operate relay 420 to start his transmitter again, until removal of the fixed station's carrier releases squelch relay 410.

Responsive to removal of the called mobile unit's carrier, squelch relay 250 associated with radio receiver 228 in the radio station 300 is caused to release. Relay 250, upon releasing, at its contacts 251 opens one of the multiple circuits to power relay 320, at its contacts 253 re-establishes the operating circuit for relay 245, and at contacts 254 opens the circuit to the signal-in relay 110. Relay 245 now re-operates, from transmitter 301 by way of conductors 304 and contacts 253, and connects ground and negative battery to conductors 194 and 195, thereby energizing the windings of relay 180 in series. Relay 180 accordingly re-operates, and at contacts 182 disconnects relay 110 from the simplex circuit. Relay 180 also, at contacts 181 connects dial tone to the calling line as a disconnect signal.

The signal-in relay 110 restores, upon interruption of its circuit, and at contacts 112 operates relay 130. Relay 110 also at contacts 113 opens the circuit to relays 150 and 50. Relay 50 restores quickly, and relay 150 being slow to release, releases shortly thereafter. Relay 150 upon restoring, at contacts 152 opens the circuit of relay 140 which restores. Relay 150 also at contacts 154 again opens the circuit of relay 130 which however is now locked to contacts 143 and 164. Relays 60 and 160 also remain operated.

When now the calling subscriber T in the automatic exchange hangs up, the loop to the repeater line relay 60 is interrupted as before, and the latter relay restores. Delay 60 upon restoring at contacts 63 opens the operate circuit to hold relay 160, which restores after a short delay, and at contacts 166 removes holding ground from control conductor 16 in the trunk 12, thereby causing the release of the switches 10 and 11, as before. Relay 60 also at contacts 61 opens the signal-out conductor 170 leading to the pulsing-out relay 200 in the control station 300. Relay 200 thereupon restores, and opens the circuit for relay 205 which also restores after a short delay. Relay 205 upon restoring opens the last point in the multiple circuit to power relay 320 which thereupon restores, and causes radio transmitter 301 to take its carrier off the air. Relay 130 in the repeater restores after relay 160 releases.

When the fixed station carrier goes off the air, relay 245 is caused to restore, and brings about the release of relay 180 in the auxiliary equipment 179. Removal of the fixed station's carrier also causes the release of squelch relay 410 in the mobile unit. Relay 410 thereupon at contacts 411 removes plate voltage from the tone detector, and at contacts 412 opens the holding circuit for relay 470 which also restores. At contacts 413 relay 410 also prepares the operate circuit for relay 420, thereby restoring the mobile equipment to normal condition, ready to receive or make calls. It will readily be seen that relay 420 cannot be re-operated, once it has been restored, until relay 410 has also been restored. The mobile station is thus locked out until the mobile unit is completely released.

The radio transmitters and receivers employed with this system are preferably crystal controlled, frequency modulation units for operation in the frequency band of 30–44 megacycles, with facilities for operation from a low voltage service of direct current by the substitution of a different power pack where employed in a moving vehicle. Such transmitters and receivers are the General Electric Type RSA, RMV and RMD receivers, and the Type TSA and TMD transmitters, such as illustrated in a publication entitled: "GE Radio Communication Equipment Instructions for Mobile Emergency Equipment," published at Syracuse, New York, in May 1947 and marked GE 1–23144. When a signal is being received, the carrier from the transmitter is substantially free from noise, but when no carrier is present the extreme sensitivity of the receiver brings in the background noise. Provision is accordingly made in the receivers for removing this noise during carrier-off periods by means of a "carrier-off-noise-supression" circuit commonly known as a "squelch" circuit. The squelch relays of this disclosure are connected across the squelch circuit in such a way as to be operated instantly when the incoming carrier opens the squelch circuit.

*Mobile unit call to exchange subscriber*

Assuming now that the subscriber in the mobile set 500 wishes to place a call to subscriber T in the automatic exchange 1, the subscriber in the mobile unit removes his handset 501 from its associated switchhook 503, whereupon, assuming the channel is free and squelch relay 410 is unoperated a circuit is completed for relay 420 over contacts 413, conductor 523, contacts 504, conductor 526, contacts 704 and 734, and conductor 707. At its contacts 505 the hookswitch completes the circuit for the "In use" lamp 515 extending from contacts 413 over conductor 523, and contacts 504 and 505. Relay 420 operates, at its contacts 421 and 428 completes a circuit for the relay 630, comprising contacts 413, 428, 421, and conductor 654, at its contacts 422 disconnects the audio frequency output of radio receiver 400 from transformer 417, and the associated tone detector circuit, and at its contacts 423 connects the said audio frequency output to the receiver in the handset over conductor 522 whereby the calling mobile subscriber will receive an incoming dial tone or busy tone when it is returned subsequently from the automatic exchange. Relay 420 also, at its contacts 425 prepares a point in the operating circuit for dial 510, at its contacts 428 prepares a self-holding circuit, and at its contacts 429, completes an operating circuit for relay 700 including contacts 415, 429, conductor 706 and contacts 702. Relay 630 operates, and at its contacts 631 completes an operating circuit for dynamotor 650 thereby supplying anode voltage to initiate operation of the radio transmitter 600, which thereupon places its radio carrier on the air over antenna 600'. Relay 700, however, whose function will be explained in detail under a separate heading does not operate, under normal conditions, since it is inherently slow to operate, and its circuit is ordinarily closed only very briefly.

Radio receiver 228 in the radio station control circuit 300 operates responsive to the radio carrier transmitted by mobile unit 500 when the call is initiated by the subscriber thereat and completes an operating circuit for squelch relay 250 over the conductors 229. Relay 250 operates, and at its contacts 251 completes an operating circuit over conductor 310 to transmitter control relay 320. Squelch relay 250 also, at its contacts 252 completes the bias control circuit over resistors 234 and 235 for the tone detector circuit 293. Tubes 297 and 298 in the tone detector circuit are biased to cut-off by the full 48 volts of negative battery while the circuit is in the standby condition. The grounded positive 48 volts from contacts 209 through resistors 234 and 235, lowers the bias from the cut-off condition to the proper bias for reception of the pulse tones. Relay 250 also at its contacts 253, opens a point in the circuit to relay 245 to thereby prevent operation of relay 245 when the transmitter 301 operates responsive to operation of transmitter control relay 320. Relay 250 further, at its contacts 254 completes a circuit for relay 110 of the automatic exchange 1 (Fig. 1B) over contacts 254, 282, 278, 244, 242, both windings of relay 240, contacts 249 and 247, windings of repeating coil 237, contacts of the jacks 221 and 222, conductors 195 and 194, contacts of jacks 196 and 197, lower windings of hybrid repeater coil 183, conductors 189 and 189', contacts of key 198, both windings of relay 180, contacts 182, conductor 173 to relay 110. Transmitter control relay 320 operates, and at its contacts 321, completes a circuit from the 115 volt, 60 cycle, power supply 322 over master power switch 323 to the transmitter high voltage control arrangement. In more detail, the circuit extends over the right-hand switch contact, conductors 341, 345, 346 and 347, contacts 321, conductor 348 to the primary of the transformer 302 connected in the high voltage rectifier circuit (not shown) of the radio transmitter 301, and conductor 340 to the left hand side of the master switch 323. Completion of the transmitter high voltage supply in this manner places the carrier of the transmitter 301 on the air, in known manner. In the mobile set 500, radio receiver 400 receives the fixed station transmitter carrier over its antenna 400' and operates squelch relay 410. Relay 410 upon operating, at its contacts 411 extends plate voltage for the tubes 403 and 404 to the tone detector circuit, at its contacts 412 completes a holding circuit for relay 420 over contacts 412 and 428, conductor 523, contacts 504, conductor 526, contacts 704 and 734, and conductor 707, at its contacts 413 opens the operate circuit for relay 420, and at its contacts 415 opens the circuit to the "Out of range" relay 700, to prevent the latter from operating.

Returning now to the fixed equipment the relays 240 and 180 do not operate in response to the closure of the previously traced simplex circuit over conductors 194 and 195 by the operated squelch relay 250, due to their windings being energized in opposition. Signal-in relay 110 operates however, and at its contacts 113 completes an obvious circuit for operating hold relay 150. Upon operating, hold relay 150 completes at contacts 151 a circuit including contacts 161, 151 for energizing the upper winding of the switch relay 90 thereby to cause the latter relay to operate. Upon operating, switch relay 90 interrupts, at contacts 93 and 95, normal connections between the conductors 171 and 172 extending from hybrid coil 183 in the central office auxiliary equipment 179 and the line conductors 14 and 15 of the outgoing trunk 12 extending to the selector 11 in the automatic exchange. Also switch relay 90 completes at contacts 91, 92 and 94 a connection between the line conductors 171, 172 extending to hybrid coil 183, and line conductors 17 and 18 of the incoming trunk 20 extending to the incoming selector 24. Also the switch relay 90 completes at contacts 91, a circuit for connecting the upper winding of answer relay 100 across line conductors 17 and 18 of the incoming trunk 20 extending to the incoming selector 24 thereby to effect seizure of the incoming selector 24 over a loop comprising conductor 17, contacts 91, relay 100, contacts 111, and conductor 18. The switch relay 90 also interrupts at contacts 97 a normally completed path including contacts 97, 165, for applying battery potential from impedance 70 to the control conductor 16 of the outgoing trunk 12, and completes at contacts 96 a substantially identical path including the contacts 96 for applying ground potential to the control conductor 16. The normal marking of the out-going trunk 12 as idle is thus removed, and the out-going trunk 12 is now marked as busy to all outgoing selectors. When the incoming selector 24 is seized by the repeater 49 as noted above, ground potential is returned by the selector over control conductor 19 of the incoming trunk 20, thereby to complete a circuit for energizing the lower, polarizing winding of the answer relay 100 and for energizing the lower winding of the switch relay 90 in multiple therewith. The answer relay 100 does not operate at this time since it is of the shunt field type and will not operate until both its windings are energized in such a direction as to produce the same magnetic polarity, and since the upper winding thereof is now energized in the opposite direction over the loop circuit extending by way of the line conductors 17 and 18 of the incoming trunk 20 to the incoming selector 24.

At this time the radio link has seized trunk circuit 20 and the latter trunk circuit has seized the incoming selector 24 rendering it responsive to the first digit to be transmitted from the mobile set 500. The incoming selector 24 is effective to place dial tone on the line responsive to seizure in a well known manner, which tone is transmitted over conductors 17 and 18 of trunk 20 and contacts 91, 92, 111, 94, conductors 171 and 172, hybrid coil 183, trunk 185 to repeating coil 184, the contacts on jacks 193 and 192, conductors 190 and 191, contacts of jacks 220 and 223, repeating coil 236, low pass filter 285, conductors 306 and 307, to radio transmitter 301, whereupon it is superimposed upon the transmitter carrier over antenna 301′ to the radio receiver antenna 400′, whence it is impressed upon the audio frequency output of the radio receiver 400 and transmitted over contacts 423, conductor 522 to the telephone receiver in the handset 501.

*Selecting exchange subscriber*

Responsive to receipt of dial tone from the incoming selector, the calling mobile subscriber will proceed to operate the telephone dial 510 in the usual manner, to dial the digits comprising the call number of the wanted subscriber T in the automatic exchange. As soon as the dial 510 is moved from its normal position for transmitting the first digit, a cam, not shown, closes the off normal springs 513, which remain closed until the dial is again at normal. Transfer relay 640 thereupon operates quickly, over a circuit comprising contacts 412, 425, conductor 521, contacts 513, and conductor 673.

Transfer relay 640 upon operating, at its contacts 642, 644, 646, 648 and 649 opens the connections whereby the tubes 403 and 404 and their associated network are normally connected up as a tone detector circuit, and at its contacts 641, 643, 645 and 647 re-connects them in a manner whereby the arrangement is operative as a tone oscillator circuit. More specifically, at contacts 642 the plate circuit of tube 403 is disconnected from relay 445, while at contacts 641 the plate circuit of tube 403 is connected to conductor 663, whereby the 3000 cycle output of the tube while acting as an oscillator appears across a portion of the primary winding of transformer 401′, and is thence passed by induction into the secondary winding. At its contacts 644, relay 640 disconnects the plate circuit of tube 404 from relay 440, and at its contacts 643 connects the plate circuit of tube 404 to conductor 669, whereby the 2800 cycle output of this tube while acting as an oscillator, appears across a portion of the primary winding of transformer 402′, from where it is induced into the secondary winding shown on the left, just below the secondary winding of transformer 401′. At its contacts 646 relay 640 disconnects a portion of the resistance network 443 used when the tubes act as tone detectors, and at its contacts 645, connects up a different portion of the network for use with the tube grids and cathodes while acting as oscillators. At its contacts 647 relay 640 connects the high voltage plate supply circuit extending from the radio receiver 400, and at its contacts 648 and 649 disconnects the normal tone input circuit to the grids of tubes 403 and 404. The 3000 and 2800 cycle oscillation outputs of the tubes are now available for use as modulations of the carrier for pulsing purposes.

When the calling mobile subscriber releases the dial 510 to send the 1st digit, it rotates by spring tension back to its normal position, whereupon the cam 511 closes and opens the pulsing contacts 512 a number of times corresponding with the value of the digit dialled. Upon each closure of contacts 512, pulsing relay 620 operates, in a circuit comprising contacts 412, 425, conductor 521, contacts 513, 512 and conductor 674. At each such operation relay 620, at its contacts 621, completes a circuit for pulsing relay 610, at its contacts 623 removes a short circuit from resistor 653 in the radio transmitter input circuit, and at its contacts 622 connects the secondary of transformer 401′ across the resistor 653. Thereupon the 3000 cycle output of the oscillator tube 403 is impressed upon the input circuit of the radio transmitter 600 over conductors 661 and 662, contacts 622, conductors 675 and 677 and across resistance 653, and is thereby transmitted as a modulation of the outgoing carrier. Relay 610 then operates, after a slight delay due to its being made slightly sluggish by means of a shunting non-inductive resistance across its winding. At its contacts 612, relay 610 removes a short circuit from resistor 652 in the input circuit of the radio transmitter 600, and at its contacts 611 connects the secondary of transformer 402′ across the resistor 652. Thereupon the 2800 cycle tone output of the oscillator tube 404 is impressed upon the input of the transmitter 600, over conductors 660 and 661, contacts 611, conductors 677 and 678 to resistance 652, and is thereby transmitted over the aerial 600′ as a second modulation of the outgoing carrier. During each succeeding open period of the pulsing contacts 512, relays 620 and 610 release, in the same sequence, and remove the 3000 and 2800 cycle modulating tones from the carrier. It should be noted that the dial 510 is what is known as an "open circuit" dial (pulse contacts normally open), in contrast to the standard "closed circuit" dial (pulse contacts normally closed) used in standard automatic telephone systems.

When the 3000 cycle modulation tone is received by radio receiver 228 at the fixed station, it is impressed over conductors 233 on the primary winding of transformer 294 of the tone detector 293, from where it is induced into the secondary winding, and the associated tuned circuits 295 and 296. Tuned circuit 295 is now effective to impress this tone upon the grid of the associated tube 297, which immediately fires, and operates relay 255 which is connected in its plate circuit. Relay 255 in turn, at its contacts 256 completes an operating circuit for relay 260. Relay 260 upon operating, at its contacts 261 prepares a self-holding circuit, and at its contacts 262 prepares an operating circuit for relay 270. When the second part of the pulse is received by the radio receiver 228 in the form of a 2800 cycle tone, this tone is also impressed over conductors 233 upon the primary winding of transformer 294, whence it is induced into the secondary and into the tuned circuits 295 and 296. Tuned circuit 296 is thereupon effective to impress this tone upon the grid of the associated vacuum tube 298. Tube 298 operates and completes an operating circuit for relay 265 which is connected in its plate circuit. Relay 265 operates and, at its contacts 266 completes an operating circuit for relay 270, at its contacts 267 completes a holding circuit for relay 260, and at its contacts 268 opens the operating circuit to relay 260. Relay 260 holds over the holding circuit comprising contacts 256, 267 and 261. Relay 270 operates over the circuit comprising contacts 256, 266 and 262, and at its contacts 271 completes an operating circuit for relay 275 over contacts 281. Relay 275 operates and, at its contacts 276 completes a self-holding circuit over contacts 281, at its contacts 277 completes an operating circuit for relay 280, and at its contacts 278 opens the simplex circuit which extends to the signal-in relay 110 (Fig. 1B) which is located in the automatic exchange to thereby initiate the open period of a pulse. Relay 280 now operates, at its contacts 281 opens the holding circuit for relay 275, and at its contacts 282 opens a further point in the simplex circuit for relay 110. Relay 275 releases, and at its contacts 278 closes a point in the simplex circuit for relay 110, and at its contacts 277 opens the operating circuit to relay 280. Relay 280 releases and at its contacts 282 recloses the simplex circuit to relay 110 thereby to re-operate relay 110. Relays 275 and 280 are made slightly slow to release however, by the use of bridging non-inductive resistors, so that by the time relay 280 has restored, contacts 271 are again open, thus preventing re-operation of relay 275 until the next pulse is received. The bridging resistors connected to relays 275 and 280 have values chosen to regulate the operate and release times of these relays to approximate the desired pulse ratio in the impulses transmitted to the inward-pulsing relay 110, regardless of possible minor irregularities in the received radio pulses. It will be obvious that the tones must be received in the correct sequence, however.

When the 3000 and 2800 cycle modulation tones are removed from the carrier by the mobile unit pulsing relays 620 and 610, during the open period of each impulse from the dial 510, the tubes 297 and 298 cause the release of relays 255 and 265. Relay 255, which releases first, opens the circuit to relays 260 and 270. Relay 270 thereupon releases immediately and relay 260, which is also made slightly sluggish by the use of a non-inductive resistor in multiple, releases shortly thereafter. It is thus seen that the relays 275 and 280 open the circuit to relay 110 during the make period of each pulse from the mobile unit dial, and re-close this circuit during each succeeding break period, thus inverting the pulses as required.

Relay 110 accordingly restores and re-operates over the inward simplex circuit, at each received impulse, to control the incoming selector 24. At each restoration, relay 110, at contacts 113, interrupts the circuit to hold relay 150 momentarily but this relay being made slow to release, remains operated. Also, each time relay 110 restores and re-operates, it closes and then interrupts, at its contacts 112, a circuit to the dial relay 130. Relay 130 operates quickly, upon the first closure of its circuit, and being also of the slow-to-release type, remains operated during the succeeding momentary interruptions in its circuit. Upon operating, dial relay 130 completes, at the contacts 131, a shunt path including resistor 176 in multiple with the upper winding of the answer relay 100 across the line conductors 17 and 18 of the incoming trunk 20, thereby to improve the pulsing circuit to the incoming selector 24. Finally, each time the signal-in-relay 110 restores and re-operates, it interrupts and then re-completes at contacts 111 the previously traced loop circuit extending by way of line conductors 17 and 18 of the incoming trunk 20 whereby impulses of the first digit are transmitted to the incoming selector 24 in order to cause corresponding operation thereof. More particularly, the incoming selector 24 operates in response to the first digit to select the corresponding group of connectors including the connector 22 and then operates automatically to select an idle connector in the previously selected group. For example, the incoming selector 24 may seize the trunk 21 extending to the connector 22 whereby the connector 22 is conditioned to be responsive to the second and third digits to be transmitted from the mobile set 500. At the conclusion of the first digit transmitted by the mobile set 500, relays 275 and 280 are in the released condition, and maintain relay 110 in the operated position. Relay 110 in its operated position re-establishes the circuit of hold relay 150, as well as the previously traced loop circuit extending by way of line conductors 17 and 18 and the incoming trunk 20 to the incoming selector 24. Finally, the operated signal-in-relay 110 maintains interrupted at contacts 112 the previously traced circuit for the dial relay 130. The latter relay restores shortly thereafter.

Upon restoring, dial relay 130 interrupts at contacts 131 the previously mentioned path including resistor 176 for short-circuiting the upper winding of the answer relay 100.

The second and third digits transmitted by the mobile set over the radio link are repeated to the simplex circuit in an identical manner whereby they are repeated by the signal-in-relay 110 over the incoming trunk 20, the incoming selector 24, and the trunk 21 to the connector 22, in order to cause corresponding operation thereof to select the subscriber line 2 extending to the called subscriber at substation T in the automatic exchange 1 whereby the idle or busy condition thereof is tested in the connector 22. If the called line is busy, the connector 22 will impress busy tone on the incoming trunk 20 in known manner, and this busy tone will be pressed back to the calling mobile subscriber by the radio transmitter 301 in the same manner as was the dial tone from selector 24. Assuming, however, that the sub-station T is idle at this time, the line circuit 7 thereof is operated to disconnect the line relay therein from line 2, while the connector grounds control conductor 6, thereby marking the subscriber sub-station T as busy to the other connectors in the group, in known manner. Also the connector 22 operates to bridge ringing current across the line conductors 3 and 4 of the subscriber line 2 in order to operate the ringer at the called subscriber sub-station T, and to return ring-back tone current over the line conductors of the trunk 21 and consequently over the incoming selector 24, line conductors 17 and 18 of the incoming trunk 20 and the line conductors 171, 172 to the hybrid coil 183 in the central office auxiliary equipment 179. The ring-back tone is passed from the hybrid coil 183 through the transmission low pass filter 285 which is connected to the input circuit of radio transmitter 301 whereby it is superimposed on the transmitter carrier and transmitted to the radio receiver 400 of the mobile unit 500, whence it is impressed upon the audio frequency output of the radio receiver 400 over contacts 423 and conductor 522 to handset 501 in order to indicate to the mobile subscriber that the called subscriber in the automatic exchange is being rung.

*Exchange subscriber answers*

When the subscriber at the called sub-station T in the automatic exchange 1 answers the call, the connector 22 switches through, to interrupt the application of ringing current and the ring back tone. Also the connector 22 operates to bring about a reversal of polarity over the line conductors of the trunks 21 and 20, whereby the polarity of the upper winding of the answer relay 100 in the trunk circuit 20 is reversed, and relay 100 operates. Upon thus operating, the answer relay 100 interrupts at its contacts 101 a normally completed termination circuit including resistor 174, contacts 101, 62, and condenser 175 extending between the line conductors 171 and 172 interconnecting the trunk circuit comprising conductors 171 and 172 and the hybrid coil 183 in the central office auxiliary equipment 179, in order to prepare the connection for conversation between the subscriber at the mobile unit and the called subscriber sub-station T in the automatic exchange 1. The answer relay 100 also completes at its contacts 102 an obvious circuit to energize the lower winding of the supervisory relay 80. The latter relay operates, and completes at its contacts 81 an obvious path for applying ground potential by way of resistor 177 to the signal-out conductor 170 for operating pulsing relay 200 over the previously traced simplex circuit. Relay 200 operates and at its contacts 201 completes an operating circuit for relay 205. Relay 205 operates and at its contacts 206 completes a multiple holding circuit for relay 320 which controls the energizing circuit for the transmitter at the radio station control circuit. Relay 205, at its contacts 209, opens the energizing circuit for the vacuum tubes in the tone detector circuit 293, whereby the radio station control circuit is rendered non-responsive to further pulses.

At this time the mobile unit subscriber may converse with the subscriber at the called subscriber sub-station T in the automatic exchange 1 over a talking circuit comprising the transmitter of the handset 501, conductor 672, transformer 651, radio transmitter 600, antennas 600′ and 228′, radio receiver 228, conductors 233, transformer 237, contacts on jacks 221 and 222, conductors 194 and 195, contacts on jacks 196 and 197, hybrid coil 183, conductors 171 and 172, contacts 94, 111, 92 and 91, conductors 17 and 18 of trunk 20, incoming selector 24, trunk 21, connector 22, and conductors 3 and 4 of line 2 to the subscriber substation T. In the reverse direction, the talking circuit comprises the transmitter of the telephone subset T, the connector 22, trunk 21, selector 24, conductors 17 and 18, contacts 91, 92, 111, 94, conductors 171 and 172, hybrid coil 183 and repeating coil 184, contacts on jacks 192 and 193, conductors 190 and 191, contacts on jacks 220 and 223, transformer 236, filter 285, radio transmitter 301, antennas 301′ and 400′, radio receiver 400, contacts 423, conductor 522, and the receiver of the mobile unit's handset 501. Talking battery for the called subscriber subset T in the exchange 1 is furnished from the connector 22, while talking battery for the mobile subscriber's handset 501 is furnished, as before, from battery through relay 630, over conductor 632, impedance coil 633, right winding of transformer 651, and conductor 672.

*Normal release*

Now assuming the subscriber at the calling mobile set 500 restores his handset 501 to switchhook 503 first, the holding circuit for relay 420 is opened at switch contact 505. The operating circuit for the timer motor is likewise opened at these contacts, while the clutch 716 is deenergized at contacts 506 to disengage the shaft 725 from the motor-reduction gear unit 715. The return spring 718 then causes the cams 720 and 730 to return to their normal illustrated position, in readiness for a subsequent call. Relay 420 restores and, at its contacts 421 opens the operating circuit for transmitter control relay 630, at its contacts 423 disconnects the audio frequency output circuit of radio receiver 400 from handset 501 and connects the audio frequency output circuit over contacts 422 to the input circuit for the mobile unit tone detector circuit in preparation for a subsequent incoming call. Relay 420 at its contacts 424 prepares the plate supply for the tubes 403 and 404 to place the tone detector circuit in the stand-by condition, and at its contacts 428 opens a further point in its own operating and holding circuit. Relay 630 releases, and at its contacts 631 opens the circuit to the dynamotor 650, to thereby interrupt the high voltage supply for operating transmitter 600. Transmitter 600 removes its carrier from the air responsive to interruption of the high voltage supply.

Relay 250 in the radio station control circuit 300 releases, responsive to the mobile unit's carrier being removed from the air, and at its contacts 251 removes one of the multiple holding grounds for the transmitter control relay 320, at its contacts 252 interrupts a point in the tone detector grid control circuit, at its contacts 253 completes the operating circuit for relay 245, and at its contacts 254 interrupts the simplex control circuit to relay 110 in the trunk repeater circuit 49. Relay 245 re-operates from transmitter 301, and at contacts 246 and 248 re-operates relay 180 over the inward simplex. Relay 180 at contacts 181 connects dial tone to conductor 172, and at contacts 182 disconnects relay 110. Relay 110 restores, and at its contacts 112 completes a holding circuit for energizing the upper winding of the supervisory relay 80 over contacts 82 and 98. Relay 110 also at contacts 111 interrupts the previously traced loop circuit extending between the upper winding of the answer relay 100 and by way of incoming trunk 20 to the incoming selector 24 and thence by way of trunk 21 to connector 22 to thereby bring about the release of connector 22. When the connector 22 is released ground potential therein is removed from the control conductor 6 of the subscriber line 2 extending to the line circuit 7 whereby the line circuit 7 partly restores, to maintain the busy marking on the subscriber line 2, at the connectors in the group including the connector 22, having access thereto. Also when the connector 22 is released, ground potential is removed from the control conductor of the trunk 21 bringing about the release of the incoming selector 24, and the removal of ground potential from the control conductor 19 of the incoming trunk 20. When ground potential is removed from the control conductor 19 of the incoming trunk 20 the previously traced multiple circuits for energizing the lower windings of the answer relay 100 and the switch relay 90 are interrupted.

Also upon restoring, signal-in relay 110 recompletes at contacts 112 the previously traced circuit for operating dial relay 130, and interrupts at the contacts 113, the previously mentioned circuit for maintaining operated hold relay 150, whereby the latter relay restores shortly thereafter, it being of the slow-to-release type. Upon restoring, the hold relay 150 interrupts at contacts 154 the previously traced circuit for maintaining operated the dial relay 130 thereby causing the latter relay to restore shortly thereafter, it being also of the slow-to-release type. However, the hold relay 150 interrupts at contacts 151 the previously traced circuit for energizing the upper winding of switch relay 90, thereby to cause the latter relay to restore. Upon restoring, the switch relay 90 interrupts at contacts 91, 92 and 94 further points in the previously traced connections between the line conductors 171 and 172 extending to the central office auxiliary equipment 179 and the line conductors 17 and 18 of the incoming truck 20 extending to the incoming selector 24; and recompletes at contacts 93 and 95 previously traced normal connections between the line conductors 171 and 172 and the line conductors 14 and 15 of the outgoing trunk 12 accessible to the outgoing selector 11. Further, switch relay 90 interrupts, at contacts 96, the previously traced path for applying ground potential to the control conductor 16 of the outgoing trunk 12 and recompletes, at contacts 97, the previously traced normal path for applying battery potential by way of impedance 70 to the control conductor 16, thereby to mark the outgoing trunk 12 as idle to the outgoing selectors 11. Further, switch relay 90 interrupts, at contacts 98, the previously traced circuit for energizing the upper winding of supervisory relay 80, thereby to cause the latter relay to restore shortly thereafter, it being also of the slow-to-release type. Upon restoring, the supervisory relay 80 interrupts, at contacts 81, the previously traced path for applying ground potential by way of resistor 177 to the signal-out conductor 170 extending to the central office auxiliary equipment 179 and the radio station control circuit 300.

When ground potential is removed from conductor 170, the previously traced circuit for maintaining operated the signal-outline relay 200 in the radio station control circuit 300 is interrupted, causing the latter relay to restore. Upon restoring, the signal-out line relay 200 interrupts, at contacts 201, the operating circuit for relay 205. Relay 205 releases, and at its contacts 206 interrupts the holding circuit for the transmitter control relay 320. Transmitter control relay 320 releases and effects the deenergization of transmitter 301 and the consequent removal of its carrier from the air. At this time trunk circuit 49, central office auxiliary equipment 179, and the radio station control circuit 300 are completely released and available for further use. Responsive to removal of the transmitter carrier from the air squelch relay 410 associated with radio receiver 400 in the mobile set 500 is released to re-establish the original operate circuit for relay 420, whereby the mobile set is made ready for a subsequent call. The line circuit 7 is released to its normal condition when the subscriber T replaces the receiver of the telephone instrument upon its associated switchhook.

Now assuming that the subscriber at the called sub-station T in automatic exchange 1 replaces the receiver of the telephone instrument before the calling party in the mobile set 500 replaces his receiver, the connector 22 reverses the polarity over the trunk 21, the incoming selector 24, and the incoming trunk 20 to the upper winding of the answer relay 100 in the trunk repeater 49, causing the latter relay to restore. Upon restoring, the answer relay 100 recompletes, at its contacts 101, the previously traced termination circuit including resistor 174 and condenser 175 which bridges the line conductors 171 and 172 extending to the central office auxiliary equipment 179 and the radio station control circuit 300; and interrupts at the contacts 102 the previously traced circuit for maintaining operated the supervisory relay 80, thereby to cause the latter relay to restore shortly thereafter, it being the slow to release type. Upon restoring, supervisory relay 80 interrupts at the contacts 81, the previously traced path for applying ground potential by way of resistor 177 to the signal-out conductor 170 extending to the central office auxiliary equipment 179 and the radio station control circuit 300 to bring about the restoration of the signal out line relay 200. The relay 200, at its contacts 201, opens the operating circuit for relay 205. Relay 205 releases shortly thereafter, being the slow to release type, to open a multiple holding ground at its contacts 206 for transmitter control relay 320. The transmitter control relay 320 is maintained operated however, over the multiple ground at contacts 251 of relay 250. Relay 210 is also operated at this time for a brief interval, but does not perform an operating function.

When the calling subscriber in the mobile unit 500 thereafter replaces his handset 501 upon its associated switchhook 503, the carrier of mobile transmitter 600 is removed from the air in the manner heretofore described and squelch relay 250 associated with radio receiver 228 in the radio station control circuit 300 is released responsive to such removal. Relay 250, at its contacts 251, opens the holding circuit for transmitter control relay 320 to cause the radio transmitter 301 to remove its associated carrier from the air in the manner heretofore described. Squelch relay 410 in the mobile unit thereupon releases to restore the mobile equipment to its normal condition. Relay 250, at its contacts 254, opens the operating circuit of the signal-in relay 110 in the trunk repeater circuit 49 to cause the latter relay to restore. Upon restoring relay 110 interrupts at contacts 111 the previously traced loop circuit extending by way of the incoming trunk 20 to the incoming selector 24 and thence by way of the trunk 21 to the connector 22 thereby to bring about the release of the connector 22. When the connector 22 is thus released line circuit 7 restores to its normal condition, whereby battery potential in the line circuit 7 is applied to the control conductor 6 thereby marking subscriber line 2 idle. Also when the connector 22 is released, ground potential is removed from the control conductor of the trunk 21 bringing about the release of the incoming selector 24 and the removal of ground potential from the control conductor 19 of the incoming trunk 20. When ground potential is removed from the control conductor 19 of the incoming trunk 20 the previously traced multiple circuits for energizing the lower windings of the answer relay 100 and switch relay 90 are interrupted. Also upon restoring, the signal-in relay 110 recompletes, at contacts 112, the previously traced circuit for operating the dial relay 130, and interrupts, at contacts 113 the previously mentioned circuit for maintaining operated the hold relay 150 whereby the latter relay restores shortly thereafter.

Upon restoring hold relay 150 interrupts at the contacts 154 the previously traced circuit for maintaining operated the dial relay 130 thereby to cause the latter relay to restore shortly thereafter. Further the hold relay 150 interrupts at the contacts 151 the previously traced circuit for energizing the upper winding of the switch relay 90 thereby to cause the latter relay to restore. Upon restoring the switch relay 90 interrupts at the contacts 91, 92 and 94, further points in the previously traced connection between the line conductors 171 and 172 extending to the central office auxiliary equipment 179 and the radio station control circuit 300 and the line conductors 17 and 18 of the incoming trunk 20 extending to the incoming selector 24; and recompletes at the contacts 93 and 95 previously traced normal connections between the line conductors 171 and 172 and the line conductors 14 and 15 of the outgoing trunk 12 accessible to the outgoing selector 11. Further the switch relay 90 interrupts at the contacts 96 the previously traced path for applying ground potential to the control conductor 16 of the outgoing trunk 12; and recompletes at contacts 97 in previously traced normal path for applying battery potential by way of impedance 70 to the control conductor 16 thereby to mark the outgoing trunk 12 as idle to the outgoing selector 11 having access thereto. At this time the trunk repeater circuit 49, the radio station control circuit, and the mobile unit 500 are completely released and available for further use.

It is thus seen, that while on a call to a mobile unit, complete release normally occurs only when both parties have disconnected, on a call from a mobile unit the release is controlled entirely by the calling mobile unit.

*Camp on busy*

If the mobile subscriber removes his handset to make a call to the automatic exchange, at a time when another mobile call is in progress, the carrier of the fixed station's transmitter 301 will be on the air, and consequently squelch relay 410 will be operated in all mobile units. Accordingly, the operation of the hookswitch 503 upon removal of the hand set will be effective only as to the operation of the clutch 716, the operating circuits for relay 420, lamp 515, and the call timer motor being now open, at contacts 413. Furthermore, unamplified hum from the rectifier circuit (not shown) in the radio receiver 400, will be impressed directly on the handset receiver as an audible "channel busy" signal, by way of conductor 406, contacts 427, conductor 490, contacts 474, and conductor 522.

If the mobile subscriber now desires to utilize the camp-on-busy feature, he may do so by leaving the handset off the hook 503, and momentarily operating the "camp on busy" key 519. Upon the closure of key 519, a circuit is completed over conductor 524 to relay 495. Relay 495 operates, and at contacts 496 completes a self holding circuit over conductor 493 and contacts 414. Relay 495 also, at contacts 497 prepares a circuit for an audible "cut-in" signal to the mobile subscriber.

As soon as the channel becomes free, and the carrier of the fixed station goes off the air, squelch relay 410 restores, and at its contacts 413 lights the "In use" lamp 515, by way of conductor 523, and contacts 504 and 505. A branch of this circuit also extends to relay 420 by way of contacts 504, conductor 526, contacts 704 and 734, and conductor 707, and to the call timer motor 715 by way of contacts 733. Relay 420 operates, and at its contacts 423 connects the audio frequency output of radio receiver 400 to conductor 522 and the telephone receiver in the handset 501. The audible cut-in signal circuit, prepared by relay 495, is thereby completed from the previously mentioned tone source in the radio receiver, over conductors 406 and 408, break contacts 416, contacts 497, conductor 491 to the input side of the output amplifier stage in the receiver 400, which in turn delivers the tone through the audio frequency output of the receiver 400, contacts 423 and conductor 522, to the receiver of the handset 501, where it is made audible. The amplified tone is adjusted to a level sufficiently high to be easily heard by the operator of the mobile unit, with the handset lying on the seat or hung on a dummy hook, but not so high as to cause ear injury, if the handset is still held at the ear.

The restoration of squelch relay 410 also at contacts 414 opens the holding circuit for relay 495. Relay 495 is made slow to release however by the use of a copper slug on the heel end of the core, and holds its armature for some 100 milliseconds, after which it restores and cuts off the audible signal. Meanwhile, the operation of relay 420 has caused relay 630 to connect plate voltage to the mobile unit transmitter 600, which immediately puts its carrier on the air to seize the fixed station equipment and the incoming selector in the automatic exchange 1, in the manner previously described. This causes the fixed station transmitter 301 to put its carrier on the air, thereby re-operating squelch relay 410, which places the mobile unit equipment in readiness for the dialing operation, which then proceeds in normal manner, as soon as the telephone exchange equipment returns dial tone.

*Out of range timer, Figure 7*

The out-of-range relay 700, which as previously stated, is energized as soon as relay 420 operates upon the initiation of a call by the mobile subscriber, is a thermal relay having an operating time delay of approximately two seconds. Any other type of relay having a similar operating delay would be suitable however. Accordingly, if the fixed station carrier is not returned within two seconds following the operation of relay 420, the out of range relay 700 will operate, and lock out the mobile unit. Such a condition may occur in cases where the mobile unit may have passed beyond the operating range of the fixed station's carrier, or finds itself in a blind spot within the area. Such a condition could also occur while within range of the fixed carrier, and in a non-blind area, in cases where trouble in the mobile unit's radio receiver might prevent operation of squelch relay 410. If such mobile unit were not quickly locked out in such cases, the mobile subscriber, thinking the channel was free, would keep his carrier on the air, and perhaps interfere with an existing conversation, or with the release of an existing connection.

Reviewing briefly, the removal of the handset 501 to initiate a call, while squelch relay 410 is normal, causes relay 420 to operate from break contacts 413 over conductors 523, 526, contacts 704 and 734, and conductor 707. Relay 420 thereupon at contacts 421 operates power relay 630 from the same break contacts 413, by way of contacts 428, 421, and conductor 654, to put the transmitter 600 on the air. Relay 420, also, at contacts 429 energizes relay 700, from break contacts 415 over contacts 429, conductor 706, and contacts 702.

If now squelch relay 410 fails to operate from the fixed station's carrier within two seconds, or within the operate time of the relay 700, the latter relay will operate. Relay 700 thereupon, at its contacts 702 opens the short circuit normally across the resistor 705. Resistor 705 is of such value as to prevent appreciable rise in the temperature of the thermal relay beyond that necessary to operate the relay contacts, the current passed being only sufficient to supply the radiation and conduction losses. Otherwise the relay might get unduly hot, as it could remain energized over a considerable period of time.

Relay 700 also, at its contact 701 closes a self holding circuit extending over conductor 529 to contacts 506 on the hookswitch 503, and at its contacts 703 lights the "Out of range" lamp 517 over the conductor 527, as notice to the mobile subscriber that he is out of range, or the equivalent, and cannot complete a connection at this time. Relay 700 further, at its break contacts 704 stops the call timer, and opens the operating circuit of relay 420. Relay 420 thereupon restores, and at its contacts 421 releases power relay 630, which takes the mobile unit transmitter 600 off the air. Relay 420 also, at its contacts 429 opens the original operate circuit for relay 700, and at contacts 427 connects unamplified busy tone to the handset receiver by way of conductors 406, 490, and 522. The mobile subscriber upon hearing the hum signal and seeing the lighting of the "Out of range" lamp 517, will hang up the handset, thereby unlocking the thermal relay 700, which restores.

*Call timer, Figure 7*

Each time the removal of the handset 501 from the hookswitch causes the operation of relay 420, either on an incoming or an outgoing call, it also energizes the clutch 716 of the call timer, from contacts 506 over conductor 529, and starts the timer motor 715 from contacts 504, over conductor 526 and contacts 704 and 733, as previously explained. The motor 715 thereupon starts driving the shaft 725 and the cams 720 and 730 in a clockwise direction, at a speed to cause the cams to make a complete rotation in about 5 minutes. If the mobile subscriber hangs up his handset within the prescribed time limits, the timer does not interfere with the call, and restores to normal in the manner already described, when the mobile party disconnects. If the conversation lasts as long as 4½ minutes however, the timer will give a warning signal, and if it is still not terminated at the 5 minute mark, the timer will automatically release the connection and lock out the mobile unit.

Assuming therefore that a conversation is extended in this manner, at the end of 4½ minutes the two points 721 on the cam 720 will successively engage the cam rider 722, and will cause it to close and open the contacts 723 and 724 twice in succession, in rather slow tempo. At each closure, the contacts 723 complete a tone circuit to the handset receiver, which may be traced from conductor 406 at the radio receiver 400, conductors 408 and 709, contacts 723 and 711, and conductors 708 and 522 to the handset receiver. At the same time contacts 724 complete an obvious circuit to relay 710 which is made slow to operate. Relay 710 accordingly operates after a time delay of some 100 milliseconds, and interrupts the tone signal at contacts 711. Opening of the contacts 724 releases relay 710. Some four seconds later the operation is repeated by the second point on the cam. It is obvious therefore, that the mobile subscriber is warned, by the application of two splashes of tone of about 100 milliseconds duration each to his handset receiver circuit, that four and one-half minutes have expired, and that he is about to be disconnected.

Approximately one-half minute later, or after a total time of about five minutes, if the mobile subscriber still has not hung up, the hump on the cam 730 engages its rider 732, and causes it to open the associated contacts 733 and 734. Contacts 733 thereupon open the circuit to the timer motor 715 to terminate its operation, but leave the clutch 716 engaged, to hold the cams in place. At the same time, contacts 734 open the circuit to relay 420 which restores. Relay 420 thereupon at contacts 423 disconnects the radio receiver audio output from the handset receiver, and at its contacts 421 opens the circuit to power relay 630. Relay 420 also, at its contacts 428 opens a point in its holding circuit, now open also at contacts 734 on the timer. Relay 630 restores, as soon as its circuit is opened at contacts 621, and takes the radio transmitter 600 and its associated carrier off the air. Squelch relay 410 restores when the fixed station's carrier goes off the air. Meanwhile however, the disconnected mobile unit remains locked out, since there is now no way for relay 420 or the motor 715 to re-operate, due to the open contacts 733 and 734.

When the mobile subscriber replaces the handset on the hookswitch however, contacts 506 open the circuit to conductor 529 and the timer clutch 716. The clutch 716 thereupon releases the shaft 725 and the cams 720 and 730 which promptly restore to the normal position, re-closing the contacts 733 and 734. This again prepares the operate circuit for relay 420, thus restoring the mobile unit to normal operating condition, and dependent only upon the position of squelch relay 410, for initiating further calls.

*Out of range and call timer, Figure 7A*

Figure 7A, as previously stated, performs the same timing functions as Figure 7, but with entirely different equipment. In Figure 7A the timing is dependent upon the decrease in resistance of a self-heating resistor made of a negative-temperature-coefficient resistance material, in series with a relay coil, whereby the current fed to the relay through the resistor is gradually increased, so as to reach the relay operate value at the desired time. Also, since the resistors require at least as much cooling time as they do heating time, they must be given an idle period before recycling. Hence it is necessary to break any long timing intervals up into several parts, with the just used resistors removed from the circuit progressively, so they can be cooling while the next used resistors are functioning. For this reason, resistor 746 and relay 740 provide the first minute of the call timing interval, resistor 758 and relay 750 the next 1¾ minutes, and resistor 747 and relay 740 the remaining 1¾ minutes to total 4½ minutes, at which time the warning signal is given. Resistor 768 and relay 760 provide the final ½ minute interval of the total 5 minute period, when the mobile unit is automatically taken off the air. The effect of changes in ambient temperatures on the timing are reduced by designing the resistors so that the resistor temperature required for relay operation will be high compared to ordinary ambient temperatures. Furthermore, since exact timing is not essential in the present application, a certain amount of variation is permissible.

In describing the detail operation of these circuits, the out-of-range timer will be considered first. Whenever the handset 501 is removed from the hookswitch 503 to initiate a call from the mobile unit, assuming the channel to be free and squelch relay 410 normal, contacts 504 complete the circuit for relay 420 from contacts 413 and conductor 523, through contacts 504, conductor 526, contacts 761, and conductor 707. Relay 420 thereupon operates, and at its contacts 428 and 421 operates power relay 630 as before to put the mobile units transmitter 600 on the air. Relay 420 also, at its contacts 429 closes a circuit to timer relay 760 from contacts 415, by way of conductor 706, contacts 762, the two second timing resistor 767, and contacts 766. If the fixed station's carrier is returned promptly, squelch relay 410 operates and opens the circuit to relay 760, at contacts 415. If the return carrier is not received within two seconds however, or within the control time of resistor 767, relay 760 will operate. Relay 760 thereupon at contacts 765 locks direct to contacts 506 on the hookswitch, over conductor 529, and at contacts 761 opens the circuit to relay 420, which restores and takes the mobile unit's transmitter 600 off the air. Relay 760 also at its contacts 761, 762 and 766 disconnects the resistors 746 and 767, and at its contacts 763 lights the "Out-of-range" lamp 517, over contacts 771 and conductor 527. Upon restoration of the handset 501, relay 760 is released at contacts 506, and restores the timer to its normal condition.

The call timing circuits of Figure 7A, are dependent on the continued closure of contacts 761. Upon the initiation of an outward call for example, when the removal of the handset closes the circuit of relay 420 from contacts 413 over conductor 523, contacts 504, conductor 526, contacts 761 and conductor 707, a branch of the same circuit extends from contacts 761 through the 1-minute timing resistor 746, contacts 751 and 741 to relay 740. On an incoming call, the circuit for relay 740 is similar, except for starting at contacts 412 of the squelch relay and extending over conductor 492 and contacts 476 to conductor 423 and the hookswitch. As soon as relays 410 and 420 are both operated, the circuit passes from contacts 412 through contacts 428 to conductors 523 and the hookswitch.

Assuming now that a call is extended beyond the time limits allowed, the resistor 746, which starts to heat from its own $I^2R$ losses as soon as its circuit is completed, drops gradually in resistance, and causes relay 740 to operate, after a heating time of about one minute. Relay 740 upon operating, at its contacts 742 closes a self-holding circuit to conductor 526 over contacts 753 and 761, and at its contacts 741 opens the circuit through resistor 746. Relay 740 also, at its contacts 743 completes a circuit for relay 750, extending from contacts 761, through contacts 743, the 1¾-minute timing resistor 758, and contacts 756.

Timing resistor 758 now starts to heat, and after approximately 1¾ minutes, its resistance is reduced to a value which permits relay 750 to operate in series therewith. Relay 750 upon operating, at its contacts 755 locks direct to contacts 761 and conductor 526, and at its contacts 756 opens the circuit through resistor 758. Relay 750 also, at its contacts 753 opens the holding circuit of relay 740, which restores. Relay 750 also at its contacts 751, further disconnects the ressitor 746, and at contacts 752 completes a new circuit for the re-operation of relay 740, extending from contacts 761, through the 1¾-minute timing resistor 747, contacts 764, 752 and 741. Since resistor 747 is cold, relay 740 remains normal, and resistor 747 begins its heating cycle. After about 1¾ minutes of heating, the resistance of resistor 747 is reduced in turn to the point where relay 740 will operate in series therewith, after a total elapsed time of $$1+1\tfrac{3}{4}+1\tfrac{3}{4}=4\tfrac{1}{2} \text{ minutes}$$

Relay 740 upon re-operating in the manner described, at its contacts 742 locks to resistor 747 by way of contacts 754 and 764, and at its contacts 745 connects unamplified rectifier hum to the handset receiver circuit as before, as a warning tone. This circuit extends from conductor 406 at the receiver 400 over conductors 408 and 709, contacts 774, 758 and 745, and conductors 708 and 522 to the handset 501. Relay 740 at the same time, at its contacts 744 completes multiple circuits from contacts 761 to relays 760 and 770, by way of contacts 757. The circuit for relay 760 passes through the ½-minute timing resistor 768 and contacts 766, while the circuit for relay 770 passes through the 2-second timing resistor 774 and contacts 773.

The resistors 768 and 774 now start heating and in approximately two seconds resistor 774 causes the operation of relay 770. Relay 770 thereupon at its contacts 774 opens the warning tone circuit, at its contacts 772 locks to conductor 529 and contacts 506 of the hookswitch and at its contacts 773 opens the circuit through resistor 774. One half minute later, after a total elapsed time of approximately five minutes, if the mobile party still has not replaced the handset, resistor 768 finally causes the operation of relay 760. Relay 760 upon operating, at its contacts 765 locks also to conductor 529 and the hookswitch and at contacts 766 opens the circuit through resistor 768. Relay 760 also at its contacts 761, 762 and 764 opens the circuits to the various timer resistors, and causes the release of relays 740 and 750. Contacts 761 also open the circuit to relay 420 which restores as before to take the mobile unit's transmitter off the air. Relays 760 and 770 remain operated until the mobile subscriber restores his handset, when they also restore, and remove the lockout condition from the mobile unit.

In view of the foregoing it is apparent that there is provided herein an improved mobile telephone system for use with an automatic telephone exchange. While there have been illustrated and described what at present are believed to be the preferred embodiments of the system, it will be understood that various modifications may be made therein, and it is intended to cover in the following claims, all such modifications as fall within the true spirit and scope of the invention.

What is claimed is:

1. In an automatic telephone system, an exchange, a plurality of fixed subscriber stations and a plurality of mobile subscriber stations, a fixed single-channel radio transmitter and a receiver associated with said exchange, a mobile single-channel radio transmitter and a receiver at each said mobile station, means responsive to the dialling of the call number of any of said mobile stations from any of said fixed stations for directively calling and signalling only the called mobile station by way of said exchange and said fixed transmitter and said called station's receiver, means responsive to the dialling of the call number of any of said fixed stations from any of said mobile stations for directively calling and signalling only the called fixed station by way of said mobile transmitter and said fixed receiver and said exchange, a carrier wave generated by each of the fixed and mobile station transmitters involved in such a call, means for maintaining said carrier waves on the air continuously for the duration of the call and carrier responsive means at said mobile stations for guarding such calls from intrusion and listening in, by any of said mobile subscriber stations except the calling or called mobile station.

2. In a telephone system for extending calls over a radio link between a first group of connected subscriber stations and a second group of isolated subscriber stations in response to dial pulses initiated by the calling subscriber, an automatic exchange to which said first subscriber stations are connected, said isolated stations not being directly connected to any exchange, a repeater in said exchange, a radio control station, a pair of outward talking conductors and a pair of inward talking conductors between said repeater and said control station, means for seizing said repeater in response to dial pulses from a calling one of said connected subscriber stations, means in said repeater responsive to such seizure for seizing said control station over said outward talking conductors, a radio transmitter in said control station energized to place its carrier on the air responsive to said last named seizure, a supervisory relay in said control station connected to said transmitter and operated therefrom over such connection responsive to said energization of said transmitter, a dial tone relay in said repeater, and means responsive to the operation of said supervisory relay for operating said dial tone relay over said inward talking conductors to give an audible signal to said calling connected subscriber station.

3. In a telephone system as in claim 2, means for repeating further dial pulses from said calling connected subscriber station over said outward talking conductors and said control station radio transmitter to select and signal a called one of said isolated subscriber stations, a radio transmitter at such called isolated station, means for energizing said isolated transmitter to place its carrier wave on the air responsive to such called station answering the call, a squelch relay in said control station operated responsive to receipt of such isolated transmitter's carrier, and contacts operated by said operated squelch relay for maintaining said control station transmitter energized to keep its carrier on the air independently of said calling connected station.

4. In a telephone system for extending calls over a radio link between a group of connected subscriber stations and a group of isolated subscriber stations, an automatic exchange and a repeater therein, a dial tone relay and a signal-in relay in said repeater, a radio control station and a radio transmitter therein, outward and inward speech conductors between said repeater and said control station, means in said exchange for seizing said repeater from a calling one of said connected stations, means responsive to such seizure for seizing said control station over said outward speech conductors to place its transmitter on the air, a supervisory relay in said control station operated responsive to said operation of said transmitter, means for operating said dial tone relay over said inward speech conductors responsive to the operation of said supervisory relay for giving an audible signal to the calling connected subscriber, means for repeating dial pulses from said calling subscriber over said outward speech conductors and said transmitter to select and signal a particular called one of said isolated stations, a radio transmitter at said called station, means responsive to said called station answering to place its transmitter on the air, a squelch relay in said control station operated responsive to said called station's transmitter coming on the air, and means responsive to such operation of said squelch relay for releasing said supervisory and dial tone relays to stop said audible signal, and for operting said signal-in relay over said inward speech conductors to complete the operation of said repeater.

5. In a telephone system for extending calls over a radio link between a first group of subscriber stations and a second group of subscriber stations, an automatic exchange, a radio control station including a radio transmitter and a line relay, means responsive to the extension of a call from a calling one of said first group of stations through said exchange to said control station for operating said line relay and causing said transmitter to place its carrier on the air, means for repeating dial impulses from such calling station to said line relay for pulsing said relay, a first and a second tone generator having different frequency outputs, means operated responsive to said pulsing of said line relay for modulating said carrier with the output of said first generator at the start of each impulse, for modulating said carrier with the output of said second generator at a later period of each impulse, and for removing said frequencies during the final portion of each impulse, signal means at each said isolated station, a stepping register at each said isolated station stepped only responsive to radio impulses each including both of said particular modulating frequencies in the correct order and at the correct time intervals one step for each full impulse, and circuits for operating said signal means from the associated register only at the particular isolated station whose call number corresponds with the pulses received.

6. In a telephone system as in claim 5, a first modulating relay operated responsive to each release of said line relay to connect the output of said first generator to said transmitter, a second modulating relay operated responsive to each reoperation of said line relay to connect the output of said second generator to said transmitter, and circuits for automatically releasing said modulating relays responsive to each said re-operation of said line relay.

7. In a telephone system as in claim 5, a radio receiver for receiving said pulses, a hum source and a telephone receiver at each said isolated station, a signal relay operated from said register only at the called isolated station, and means responsive to the operation of said relay for connecting said hum source to said radio receiver for amplifying the output thereof and for connecting the resulting amplified tone to said telephone receiver to provide an audible signal to said called subscriber.

8. In a telephone system for extending calls over a single-channel radio link between a group of subscriber stations connected to an automatic exchange and a group of isolated subscriber stations not connected to any exchange, in response to dial pulses initiated at any of said connected or isolated subscriber stations, a control station and a radio transmitter thereat, means for seizing said control station from any calling one of said connected stations to put said transmitter's carrier on the air said carrier being then kept on the air continuously for the duration of the call, a radio receiver and a squelch relay at each said isolated station, means at said isolated stations responsive to the continued receipt of said carrier for operating and holding said squelch relays from said receivers and means responsive to the continued operation of said squelch relays for disabling said isolated stations against initiating a call and against listening in on a call not intended for such isolated station.

9. In a telephone system as in claim 8, a register at each said isolated station comprising a self-releasing stepping switch with contact banks, means for repeating dial pulses from said calling connected station over said control station's carrier in the form of a first and second modulating frequency applied in that order for each impulse, a first and a second pulsing relay at each said isolated station operated in that order from said first and second frequencies respectively in response to said impulses, a third pulsing relay operated from said first relay only when said first relay is operated while said second relay is normal, means responsive only to the operation of said second relay while said third relay is operated for advancing said switch one step for each impulse of a series, register relays connected to certain contacts of said switch banks, means for operating said register relays through said contacts only at that isolated station whose bank connections correspond with the digits dialed, and means responsive only to the operation of all of said register relays at a station for signalling such station and conditioning said station to answer.

10. In a telephone system for extending calls over a common-channel radio link between a group of subscribers connected to an automatic exchange and a group of isolated subscriber stations, a telephone handset and a hookswitch for holding same at each said isolated station, a common-channel radio transmitter and a seizure relay at each said isolated staion, a control station including a single-channel radio transmitter associated with said automatic exchange, means responsive to removal of said handset from said hookswitch at any one of said isolated stations only while said control station's transmitter is off the air for operating said one station's seizure relay, means responsive to the operation of said relay for causing said one station's transmitter to place its carrier on the air, means at said control station operated responsive to receipt of said carrier for preparing a pulsing circuit to said automatic exchange and for causing said control station's transmitter to place its carrier on the air, means responsive to the receipt of said control station's carrier at said one isolated station for preparing said one isolated station for dialling, and means responsive to the receipt of said control carrier at the other isolated stations for disabling such stations.

11. In a telephone system as in claim 10, a carrier timer operated responsive to the operation of said seizure relay only in case said control station's carrier is not received by the said isolated station within a given time after the removal of sad handset and the operation of said relay, and means responsive to the operation of said timer for disabling said isolated station and removing its carrier from the air.

12. In a telephone system as in claim 10, a call timer at said isolated station, means for initiating the operation of said timer responsive to the removal of said handset at said station, means for restoring said timer to its normal position responsive to restoration of said handset, and means responsive to the completion of the operation of said timer in case said handset is not restored within a given time limit, for disabling said isolated station and removing its carrier from the air.

13. In a telephone system as in claim 12, a motor, a clutch, and a pair of cams comprising said call timer, means responsive to removal of said handset for operating said clutch and starting said motor to rotate said cams, means responsive to a given rotation of said cams for connecting a tone signal to said handset, means responsive to a given further rotation of said cams for removing said isolated station from the air and for stopping said motor to prevent additional rotation of said cams, means responsive to the restoration of said handset for releasing said clutch, and spring means responsive to the release of said clutch for restoring said cams to their normal position.

14. In a telephone system for extending calls by dialling in both directions over a common-channel radio link between a first group of subscriber stations and a second group of subscriber stations, a control station and a radio transmitter set to a fixed first frequency associated with said first group of stations; a squelch relay and a telephone handset and a hookswitch for said handset at each station of said second group of stations; a radio transmitter at each of said second group of stations set to a fixed second frequency which is the same for all of said second stations, means responsive to the removal of said handset from said hookswitch to initiate a call at any one of said second group of subscriber stations for putting the fixed carrier of such station's transmitter on the air to seize said control station if said control station is idle, means responsive to such seizure for putting the fixed carrier of said control station's transmitter on the air, means at each said subscriber station of said second group responsive to receipt of said control station's carrier thereat for operating the squelch relay thereat, and means responsive to such operation of said squelch relay at said one station alone for preparing said one station for dialling to complete the extension of the call to any wanted one of said first group of subscriber stations.

15. In a telephone system as in claim 14, a call timer at said one mobile station operative in response to the removal of said handset on both incoming and outgoing calls for taking said mobile station off the air in case said handset is not restored within a given time, said call timer comprising a plurality of relays in series with different self-heating timing resistors made of a negative-temperature-coefficient resistance material whose resistance drops upon heating to a value low enough to operate the associated relay in a given time dependent on the values of both resistor and relay, and means responsive to the operation of each of said relays to connect a succeeding relay and resistor in circuit and for progressively disconnecting prior operated ones of said relays until the operating cycle of said timer has been completed.

16. In a telephone system as in claim 15, a second timing resistor for certain of said relays, and means for re-operating such relays in series with said second resistor during the timing cycle.

17. In a telephone system as in claim 14, an out-of-range timer comprising a relay in series with a resistor made of a negative-temperature-coefficient resistance material for removing said one subscriber station from the air following the initiation of a cell thereat in case said control station's carrier is not received back promptly, a call timer comprising a plurality of sequentially operated relays in series with different resistors made of a negative-temperature-coefficient resistance material for removing said one subscriber station from the air in case said handset is not restored to said hookswitch within a given time, means for initiating the operation of said timers responsive to removal of said handset, and means for using one of said call timing relays as said out-of-range timer.

18. In a telephone system for extending calls in both directions over a common-channel radio link between any one of a plurality of subscriber stations connected to an automatic exchange and any one of a plurality of isolated subscriber stations, a common-channel radio transmitter and a telephone handset and dial at each said isolated station, means responsive to the lifting of said handset to initiate a call at any one of said isolated stations while said radio link is free for putting the carrier of such isolated station's transmitter on the air, a control station, a single-channel radio transmitter at said control station, means at said control station responsive to receipt of said isolated station's carrier for extending the call to said automatic exchange and for putting said control station's carrier on the air, means for repeating impulses from said calling station's dial over said calling station's carrier in the form of a first and a second modulating frequency successively applied to said carrier in that order during each impulse, impulse repeating means at said control station responsive only to receipt of said modulating frequencies in the proper order and in the proper timed relationship for controlling said automatic exchange in accordance with the dialled pulses to extend the call to a particular called one of said connected subscriber stations and means for keeping both of said carriers on the air continuously for the duration of the call to maintain the established connection and to guard the connection against interference or listening-in by any others of said isolated stations.

19. In a telephone system as in claim 18, a first and a second tone detector at said control station tuned respectively to said modulating frequencies, a first and a second pulsing relay at said control station operated in that order from said first and second detectors respectively in response to said impulses, a third pulsing relay operated from said first relay only when said first relay is operated while said second relay is normal, means at said control station for repeating said impulses to said automatic exchange to select and signal the called station thereat, and means for operating said repeating means responsive only to the operation of said second pulsing relay while said third pulsing relay is operated.

20. In a telephone system for extending calls over a common channel radio link between a first group of subscriber stations and a second group of subscriber stations, a telephone exchange having a radio control station connected thereto, a common-channel radio transmitter and a telephone handset and hookswitch at each of said second group of stations, means responsive to the lifting of said handset from said hookswitch to initiate a call at any one of said second group of stations while said radio link is free for putting the carrier of said calling station's transmitter on the air to seize said control station and extend the call therethrough to said exchange, a single-channel radio transmitter at said control station, a carrier wave maintained on the air by said transmitter as long as said link is busy and removed when the link becomes free, means for keeping said calling station's carrier off the air responsive to the lifting of said handset while said link is busy, a cut-in relay and manual means for operating said relay at said calling station, and cut-in circuits completed at said calling station responsive to such removal of said control carrier, provided said cut-in relay is operated and said handset is kept removed from said hookswitch, for automatically putting said calling station's carrier on the air to seize said control station.

21. In a telephone system as in claim 20, a key at said calling station, means for operating and locking said relay responsive to a momentary operation of said key, means jointly controlled by the operation of said relay and said cut-in circuits for connecting a loud audible signal to said handset, and means for automatically disconnecting said signal after a short interval of time.

22. In a telephone system as in claim 20, a tone source and a radio receiver at said calling station, means responsive to the lifting of said handset while said link is busy for connecting said tone source directly to said handset to provide an audible busy signal of low level, a cut-in key at said calling station, and means jointly controlled by the operation of said key and said cut-in circuits for connecting said tone source to said handset by way of said radio receiver to provide an audible cut-in signal of high level.

23. In a telephone system for extending calls by dialling in both directions over a common channel radio link between a first group of subscriber stations connected to an automatic exchange and a second group of isolated subscriber stations, the stations of said second group not being connected to any exchange nor to one another, a radio control station and a radio transmitter associated with said automatic exchange, means for seizing said control station from any one of said subscriber stations in either group, means responsive to such seizure for putting said transmitter's carrier on the air to busy said radio link, means for maintaining said control station carrier on the air continuously for the duration of the call, means at said isolated stations responsive to said maintained carrier for preventing the initation of a call at any of said isolated stations other than an original calling isolated station, means at said control station responsive to dial pulses from a calling subscriber station in either group for extending the call to a called station in the other group, means for releasing said control station and removing said carrier only responsive to disconnection by both calling and called stations on calls originated by any of said connected group of stations, and means for releasing said control station and removing said carrier responsive to disconnection by the calling station alone on calls originated by any of said isolated group of stations.

ROSWELL H. HERRICK.

REFERENCES CITED

The following references are of record in the file of this patent:

UNITED STATES PATENTS

| Number | Name | Date |
|---|---|---|
| 1,850,192 | Willis | Mar. 22, 1932 |
| 2,064,896 | Espenschied | Dec. 22, 1936 |
| 2,064,958 | Taylor et al. | Dec. 22, 1936 |
| 2,101,668 | Bishop et al. | Dec. 7, 1937 |
| 2,129,332 | Mastine | Sept. 6, 1938 |
| 2,265,056 | Bowers | Dec. 2, 1941 |
| 2,383,908 | Bowers | Aug. 28, 1945 |
| 2,393,291 | Clark | Jan. 22, 1946 |

| Number | Name | Date |
|---|---|---|
| 2,457,434 | Bartelink | Dec. 28, 1948 |
| 2,469,555 | Hitchock | May 10, 1949 |
| 2,490,061 | Jensen et al. | Dec. 6, 1949 |

FOREIGN PATENTS

| Number | Country | Date |
|---|---|---|
| 570,415 | Great Britain | July 5, 1945 |

OTHER REFERENCES

I. R. E. Proc., vol. 36, Waves and Electrons Section, pp. 1146–1152, September 1948; Technical Aspects of Experimental Public Telephone Service on Railroad Trains, by N. Monk and S. B. Wright.

I. R. E. Proc., vol. 27, No. 4, April 1939; Radio-Telephone System For Harbor and Coastal Services, by C. N. Anderson et al.